United States Patent
Hornback, III

(10) Patent No.: US 8,071,039 B2
(45) Date of Patent: Dec. 6, 2011

(54) MULTILAYER MOUNTING MATS AND POLLUTION CONTROL DEVICES CONTAINING SAME

(75) Inventor: Loyd R. Hornback, III, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 739 days.

(21) Appl. No.: 12/090,008

(22) PCT Filed: Oct. 10, 2006

(86) PCT No.: PCT/US2006/039033
§ 371 (c)(1),
(2), (4) Date: Apr. 11, 2008

(87) PCT Pub. No.: WO2007/044485
PCT Pub. Date: Apr. 19, 2007

(65) Prior Publication Data
US 2008/0253939 A1 Oct. 16, 2008

Related U.S. Application Data

(60) Provisional application No. 60/726,315, filed on Oct. 13, 2005.

(51) Int. Cl.
*B01D 50/00* (2006.01)

(52) U.S. Cl. .................................................. 422/179
(58) Field of Classification Search .............. 422/168, 422/177, 179, 180
See application file for complete search history.

(56) References Cited

U.S. PATENT DOCUMENTS

| | | | |
|---|---|---|---|
| 3,001,571 | A | 9/1961 | Hatch |
| 3,760,049 | A | 9/1973 | Borer et al. |
| 4,181,514 | A | 1/1980 | Lefkowitz et al. |
| 4,521,333 | A | 6/1985 | Graham et al. |
| 5,028,397 | A * | 7/1991 | Merry .............. 422/179 |
| 5,207,989 | A | 5/1993 | MacNeil |
| 5,250,269 | A | 10/1993 | Langer |
| 5,332,699 | A | 7/1994 | Olds et al. |
| 5,585,312 | A | 12/1996 | TenEyck et al. |
| 5,714,421 | A | 2/1998 | Olds et al. |
| 5,853,675 | A | 12/1998 | Howorth |
| 5,874,375 | A | 2/1999 | Zoitos et al. |
| 5,882,608 | A | 3/1999 | Sanocki |
| 6,458,418 | B2 | 10/2002 | Langer |
| 6,613,294 | B2 | 9/2003 | Sanocki et al. |
| 6,613,295 | B1 | 9/2003 | Kageyama et al. |
| 7,179,429 | B1 * | 2/2007 | Maus .............. 422/179 |
| 2005/0232828 | A1 | 10/2005 | Merry |
| 2007/0140929 | A1 | 6/2007 | Watanabe et al. |

FOREIGN PATENT DOCUMENTS

| | | |
|---|---|---|
| JP | 10/288032 | 10/1988 |
| WO | WO 99/40300 | 8/1999 |
| WO | WO 9940300 A1 * | 8/1999 |
| WO | WO 99/46028 | 9/1999 |
| WO | WO 00/75496 | 12/2000 |
| WO | WO 0075496 A1 * | 12/2000 |
| WO | WO 03/031368 | 4/2003 |
| WO | WO 2004/011785 | 2/2004 |
| WO | WO 2005/000466 | 1/2005 |

* cited by examiner

*Primary Examiner* — Tom Duong

(57) ABSTRACT

A multilayer mat (10) for mounting a pollution control element (40) in a pollution control device (60). The mat comprises at least one non-intumescent layer comprising ceramic fibers and having a width defined by opposite lateral edges, and at least one intumescent layer comprising an intumescent material and having a width defined by opposite lateral edges. The width of the intumescent layer is less than the width of the non-intumescent layer. The intumescent layer can have an exposed major surface.

20 Claims, 6 Drawing Sheets

MULTILAYER MOUNTING MATS AND POLLUTION CONTROL DEVICES CONTAINING SAME

CROSS REFERENCE TO RELATED APPLICATIONS

This application is a national stage filing under 35 U.S.C. 371 of PCT/US2006/039033, filed Oct. 10, 2006, which claims priority to Provisional Application No. 60/726,315, filed Oct. 13, 2005, the disclosure of which is incorporated by reference in its/their entirety herein.

FIELD OF THE INVENTION

The present invention relates to systems for mounting a pollution control element in a pollution control device (e.g., catalytic converters, engine exhaust filters, etc), in particular, to mats for mounting pollution control elements and, more particularly, such mounting mats having multiple layers. The present invention also relates to pollution control devices using such mounting mats and exhaust systems that include such devices.

BACKGROUND

Pollution control devices are used to reduce atmospheric pollution from the exhaust systems of internal combustion engines such as, for example, those used in motor vehicles (e.g., automobiles, watercraft, aircraft, etc.), power generators and the like. Two typical types of such pollution control devices are catalytic converters and exhaust system filters (e.g., diesel particulate filters) or traps. Catalytic converters contain one or more catalyst support elements, which are typically monolithic structures coated with desired catalyst material. The monolithic structure is typically made of ceramic, although metals have also been used. The catalyst(s) oxidize carbon monoxide and hydrocarbons or reduce the oxides of nitrogen in exhaust gases. Exhaust system filters typically include a filter element in the form of a honeycombed monolithic structure made from porous crystalline ceramic materials. In the current state-of-the-art construction of these pollution control devices, their monolithic structure is mounted within a metal housing.

Protective packing or mounting materials are typically positioned between the pollution control element (e.g., monolithic structure) and the metal housing to protect the pollution control element, for example, from road shock and vibration and to prevent exhaust gases from passing between the pollution control element and the metal housing. When a ceramic monolithic structure is used, such mounting materials typically need to compensate for the thermal expansion difference between the metal housing and the ceramic monolith. The process of mounting such a monolithic structure in a housing, with a mounting material, is referred to as "canning". Such mounting processes have included inserting the monolith into the housing and injecting a paste into the gap between the monolith and the metal housing. Other mounting processes have also included wrapping a sheet material or mat around the monolith and inserting the wrapped monolith into the housing and welding the housing closed. The compositions used to form conventional mounting materials have included a variety of non-intumescent materials and intumescent materials.

The present invention is an improvement over such prior pollution control element mounting systems.

SUMMARY

The present invention can provide one or more of multilayer mounting mats for mounting a pollution control element in a pollution control device (e.g., catalytic converters, engine exhaust filters, etc.), pollution control devices including such multilayer mats, exhaust systems including such pollution control devices, and methods for making such mats, devices and exhaust systems.

In one aspect, a multilayer mat is provided for mounting a pollution control element in a pollution control device. The mat may comprise at least one non-intumescent layer comprising ceramic fibers and having a width defined by opposite lateral edges, and at least one intumescent layer comprising an intumescent material and having a width defined by opposite lateral edges. The width of the intumescent layer is less than the width of the non-intumescent layer. It is desirable for the intumescent layer to have an exposed major surface. When the mat is used in a pollution control device operated at relatively high temperatures, the exposed major surface of the intumescent layer faces and may make direct contact with the housing of the pollution control device, such that the non-intumescent layer is disposed between the intumescent layer and the pollution control element. In this way, the non-intumescent layer insulates and protects the intumescent layer from the relatively high operating temperatures. In some applications, in contrast, where the operating temperatures of the pollution control device are relatively low, the intumescent layer faces and may make contact with the pollution control element and at least part of the non-intumescent layer is disposed between the housing and the intumescent layer. This latter embodiment can be useful when the heat generated by the pollution control element is not high enough to substantially harm the ability of the intumescent layer to expand intumescently, but the pollution control element does not get hot enough to cause such intumescent expansion, when the non-intumescent layer is disposed between the pollution control element and the intumescent layer.

The at least one non-intumescent layer and the at least one intumescent layer may be joined together, The at least one non-intumescent layer may comprise at least two non-intumescent layers, the at least one intumescent layer may comprise at least two intumescent layers, or both the at least one non-intumescent layer may comprise at least two non-intumescent layers and the at least one intumescent layer may comprise at least two intumescent layers.

The composition of each of the at least two non-intumescent layers may be different. For example, one non-intumescent layer may be more resilient than another non-intumescent layer. The composition of each of the at least two intumescent layers may be different, such that the two layers have different expansion, compression and/or erosion properties.

The width of each of the at least two non-intumescent layers may be different. It is also contemplated that the width of each of the at least two intumescent layers may different. However, it is preferred that the width of each intumescent layer be less than the width of each non-intumescent layer.

In at least one embodiment, the at least one non-intumescent layer and the at least one intumescent layer are disposed relative to one another such that both lateral edges of the at least one intumescent layer are positioned within the lateral edges of the at least one non-intumescent layer.

In at least one embodiment, the at least one non-intumescent layer and the at least one intumescent layer are disposed relative to one another such that one of the lateral edges of the at least one intumescent layer is substantially in-line with one of the lateral edges of the at least one non-intumescent layer, and only the other lateral edge of the at least one intumescent layer lies within the lateral edges of the at least one non-intumescent layer.

The non-intumescent layer may have a thickness in the range of from about 0.5 mm to about 20 mm and a bulk density in the range of from about 0.05 g/cc to about 0.4 g/cc, and the intumescent layer may have a thickness in the range of from about 0.5 mm to about 15 mm and a bulk density in the range of from about 0.4 g/cc to about 0.75 g/cc.

In at least one embodiment, the multilayer mat may further comprise a non-intumescent strip of one or more layers comprising ceramic fibers. The strip may be positioned alongside one lateral edge of the at least one intumescent layer. Preferably, the width of the strip is narrower than the width of the at least one intumescent layer. It is also preferred that the combined widths of the non-intumescent strip and the intumescent layer are together substantially equal to the width of the non-intumescent layer.

It is also contemplated that another non-intumescent strip of one or more layers comprising ceramic fibers may also be provided. One non-intumescent strip may be disposed alongside each lateral edge of the at least one intumescent layer, wherein the width of each strip is narrower than the width of the at least one intumescent layer. Preferably, the combined widths of both the non-intumescent strips and the intumescent layer are together substantially equal to the width of the non-intumescent layer.

The non-intumescent strip and the at least one intumescent layer may be substantially co-planar.

Each non-intumescent strip may have a length that is substantially equal to the length of the at least one intumescent layer.

Each non-intumescent strip may be more resilient than the non-intumescent layer. Alternatively, the non-intumescent layer may be more resilient than any non-intumescent strip. Each non-intumescent strip may have a thickness in the range of from about 0.5 mm to about 20 mm and a bulk density in the range of from about 0.05 g/cc to about 0.4 g/cc. The non-intumescent layer may have a thickness in the range of from about 0.5 mm to about 20 mm and a bulk density in the range of from about 0.05 g/cc to about 0.4 g/cc. The intumescent layer may have a thickness in the range of from about 0.5 mm to about 15 mm and a bulk density in the range of from about 0.4 g/cc to about 0.75 g/cc.

In accordance with a second aspect, a pollution control device is provided comprising a housing having an inner wall, a pollution control element disposed in the housing so as to form a gap therebetween, and a multilayer mat, such as one of the multilayer mats discussed above. The multilayer mat is disposed in the gap so as to mount the pollution control element in the housing.

In accordance with at least one embodiment, a portion of the inner wall of the housing may define a recess. The mat may be positioned in the housing so that at least a portion of only the intumescent layer is received within the recess.

In accordance with at least one embodiment, a portion of the inner wall of the housing defines a recess. The mat may be positioned so that at least a portion of the intumescent layer is received within the recess, and neither lateral edge of the intumescent layer is exposed to exhaust gases passing through the pollution control device.

In accordance with at least one embodiment, a portion of the inner wall of the housing defines a recess. The mat may be positioned so that the intumescent layer is received within the recess, and one lateral edge of the intumescent layer is exposed to exhaust gases passing through the pollution control device.

In accordance with at least one embodiment, a portion of the inner wall of the housing defines a recess. The mat may be positioned so that the intumescent layer is received within the recess and not exposed to exhaust gases passing through the pollution control device, and one intumescent strip is exposed to exhaust gases passing through the pollution control device.

Preferably, the non-intumescent layer is positioned adjacent the pollution control element.

The non-intumescent layer may be in contact with the pollution control element.

The intumescent layer may be positioned adjacent the inner wall of the housing.

In accordance with at least one embodiment, at least one of the lateral edges of the intumescent layer may be substantially sealed from exposure to exhaust gases passing through the pollution control device.

The pollution control device may comprise a catalytic converter or an exhaust system filter.

In accordance with a third aspect, an exhaust system for an internal combustion engine is provided and comprises a pollution control device constructed in accordance with any one of the embodiments discussed above.

DETAILED DESCRIPTION

Figure 1:
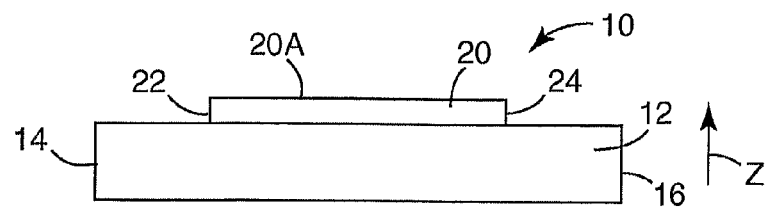
FIG. 1 is a schematic cross sectional view of a mat constructed in accordance with a first embodiment.
Figure 2:
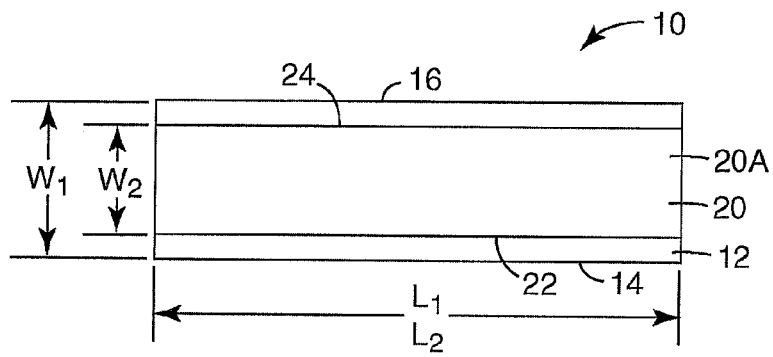
FIG. 2 is a schematic top view of the mat illustrated in FIG. 1.

A multilayer mat 10, constructed in accordance with a first embodiment, is illustrated in FIGS. 1 and 2. As will be discussed below, the mat 10 may be used for mounting a pollution control element in a pollution control device. The mat 10 comprises a non-intumescent layer 12 comprising suitable ceramic or other inorganic fibers and has a width $W_1$ defined by opposite lateral edges 14 and 16 and a length $L_1$. The mat 10 further comprises an intumescent layer 20 comprising intumescent material and has a width $W_2$ defined by opposite lateral edges 22 and 24 and a length $L_2$. In the illustrated embodiment, the width $W_2$ of the intumescent layer 20 is less than the width $W_1$ of the non-intumescent layer 12. Further, the intumescent layer 20 is positioned relative to the non-intumescent layer such that its two lateral edges 22 and 24 are positioned within the two lateral edges 14 and 16 of the non-intumescent layer 12. As illustrated in FIG. 1, the intumescent layer 20 comprises an exposed major surface 20A having an area defined by its width $W_2$ times its length $L_2$. The major surface 20A also defines an outermost layer of the mat 10.

As noted above, the mat 10 may be used to mount a pollution control element in a pollution control device. For example, the mat 10 may be used to mount a pollution control element comprising a catalyst support element 40, which, in the illustrated embodiment, comprises a monolithic structure coated with a catalyst material in a metal housing 50, see FIGS. 3 and 4. The catalyst support element 40, mat 10 and metal housing 50 define a catalytic converter 60, see FIG. 3. The metal housing 50 has an inlet 52 and an outlet 54 through which exhaust gases flow into and out of the catalytic converter 60. The metal housing 50 can be formed from one or more metals, metal alloys, or intermediate compositions, such as stainless steel or austenitic steel.

Figure 4:
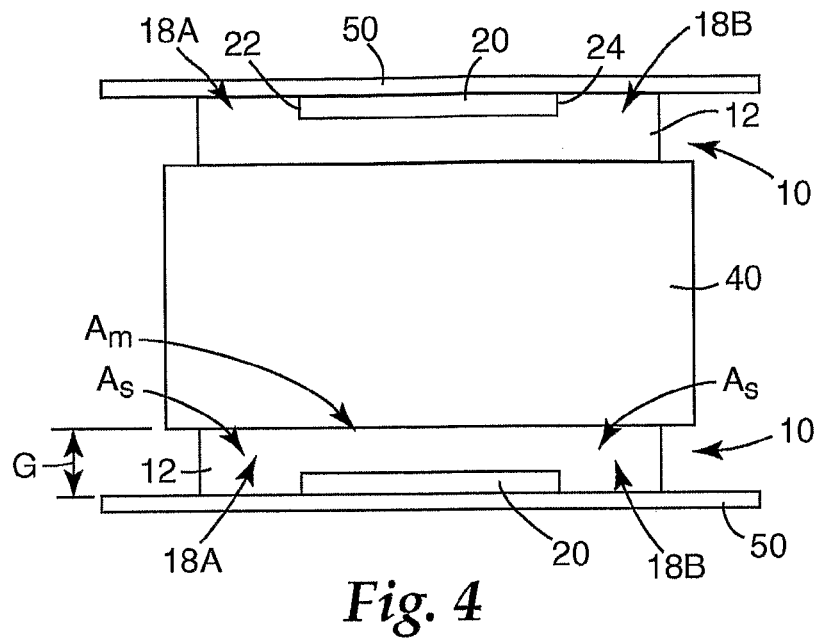
FIG. 4 is a schematic cross sectional view of a catalytic converter including the mat of FIG. 1.

Preferably, a substantially resilient non-intumescent layer 12 is selected such that once the mat 10 and the catalyst support element 40 have been mounted within the metal housing 50, outer portions 18A and 18B of the non-intumescent layer 12 fill the gap G, in at least the seal areas $A_S$, between an inner wall of the housing 50 and the support element 40, see FIG. 4, so as to seal the gap G and protect the lateral edges 22 and 24 of the intumescent layer 20. The outer portions 18A and 18B resiliently fill the gap G, when at ambient temperature or a high operational temperature. In other words, at least the outer portions 18A and 18B of the non-intumescent layer 12 are resilient enough to exert a sufficient pressure to seal the gap G and protect the intumescent layer 20, whether the gap G is at its smallest (i.e., at ambient temperature) or biggest (i.e., at the highest operating temperature). It is desirable for at least these outer portions 18A and 18B to also be durable enough to survive cycling of the gap G between its smallest and biggest over the desired life of the pollution control device. It can be preferable for the entire non-intumescent layer 12 to exhibit this degree of resilience and durability.

Hence, the intumescent layer lateral edges 22 and 24 are substantially sealed from exposure to exhaust gases, especially high temperature exhaust gases, flowing through the catalytic converter 60. When the catalytic converter 60 experiences high operational temperatures, exposure of the intumescent layer 20 to high temperature exhaust gases can damage the intumescent material in (i.e., the intumescent characteristics of) the layer 20, especially along exposed surfaces. Such damage can exacerbate the erosion of the layer 20 with increased exposure to the flowing exhaust gases. For example, vermiculite, which can be used to form part of some intumescent layers 20, can loose its intumescent characteristics when exposed to temperatures in excess of about 750° C. Hence, if the intumescent layer 20 is exposed to such damaging high temperatures, damaged portions of the layer 20 may be unable to sufficiently expand and fill the gap G with enough of a mounting force to prevent erosion of the layer 20. Even if exposed to exhaust gases at below such damaging high temperatures, the exhaust gases can still cause erosion of the layer 20. By insulating or shielding the intumescent layer 20 from exposure to exhaust gases via the outer portions 18A and 18B of the non-intumescent layer 12 and also insulating the layer 20 from high temperatures radiated by the element 40 via the non-intumescent layer 12, the intumescent layer 20 is, therefore, less likely to lose its intumescent capability to expand as the metal housing 50 expands due to increased temperatures during use of the catalytic converter 60. Because some intumescent materials are less expensive than some non-intumescent materials, this embodiment can provide a mat formed at a lower cost than mats formed primarily of non-intumescent material(s) yet still function in an adequate manner to maintain a catalyst support element 40 tightly supported within a catalytic converter metal housing 50 during use of the catalytic converter 60.

In addition to being left unsecured to each other, the intumescent layer 20 can be joined to the non-intumescent layer 12 such as, for example, by using adhesive, needle bonding, stitching, tape banding, tag attachment or co-forming, or adjacent portions of the material defining the layers 12 and 20 may be mechanically interconnected with one another.

Although FIGS. 1 and 2 illustrate a mat 10 comprising only two layers, one or more additional intumescent layers may be provided and/or one or more additional non-intumescent layers may be provided. The different intumescent layers may have different properties, such as different expansion, compression and/or erosion properties. The different non-intumescent layers may also have different properties, such as different resiliency values and/or maximum temperature limitations. An additional example of a multilayer mat constructed in accordance with the first embodiment includes layers arranged in the following order: intumescent/non-intumescent/intumescent/non-intumescent.

As used herein, the term "intumescent layer" refers to a layer that expands intumescently, other than only as a result of its coefficient of thermal expansion, for example by the inclusion of intumescent expanding materials such as vermiculite, expandable graphite, micas, and like materials. Typically, such layers need to be protected from erosion caused by exposure to hot exhaust gases.

As used herein, the term "non-intumescent layer" refers to a layer that exhibits very little or no intumescent expansion. That is, most or all of any expansion of the layer from heat exposure is the result of its coefficient of thermal expansion. Examples of non-intumescent materials include, without limitation, ceramic and other inorganic fibers.

Specific examples of substantially resilient non-intumescent materials from which the non-intumescent layer 12 may be formed include materials commercially available from 3M Company (St. Paul, Minn.) under the trade designation "INTERAM 1000HT," "INTERAM 1100HT," "INTERAM 1101HT," "INTERAM 1200NC," "INTERAM 1500HT," "INTERAM 1535HT," "INTERAM 1550HT," "INTERAM 1600HT," and "INTERAM 1600HTE." Specific example intumescent materials from which the intumescent layer 20 may be formed include materials commercially available from 3M Company (St. Paul, Minn.) under the trade designation "INTERAM 100," "INTERAM 200," "INTERAM 550," "INTERAM 2000LT," "INTERAM X-D," "INTERAM 1M," "INTERAM 1S," "INTERAM 570NC," and "INTERAM 600NC."

For a catalytic converter 60 having a mat 10 comprising a resilient non-intumescent layer 12 formed from "INTERAM 1100HT" or "INTERAM 1535HT" and an intumescent layer 20 formed from "INTERAM 550" or "INTERAM 1M," and a gap G between an inner wall of the housing 50 and the support element 40, see FIG. 4, equal to about 3 mm, it is believed that the resilient non-intumescent layer 12 can have a minimum basis weight of about 750 g/m², the intumescent layer 20 can have a minimum basis weight of about 675 g/m², and wherein the density of the combined non-intumescent layer 12 and intumescent layer 20 in a mount area $A_M$ of the gap G is equal to about 0.475 g/cc and the density of outer portions 18A, 18B of the non-intumescent layer 12 in the seal areas $A_S$ of the gap G is equal to about 0.25 g/cc. For a gap equal to about 4 mm, it is believed that the resilient non-intumescent layer 12 can have a minimum basis weight of about 1000 g/m², the intumescent layer 20 can have a minimum basis weight of about 900 g/m², and wherein the density of the combined non-intumescent layer 12 and intumescent layer 20 in the mount area $A_M$ of the gap G is equal to about 0.475 g/cc and the density of outer portions 18A, 18B of the non-intumescent layer 12 in the seal areas $A_S$ of the gap G is equal to about 0.25 g/cc. For a gap equal to about 6 mm, it is believed that the resilient non-intumescent layer 12 can have a minimum basis weight of about 1500 g/m², the intumescent layer 20 can have a minimum basis weight of about 1350 g/m², and wherein the density of the combined non-intumescent layer 12 and intumescent layer 20 in the mount area $A_M$ of the gap G is equal to about 0.475 g/cc and the density of outer portions 18A, 18B of the non-intumescent layer 12 in the seal areas $A_S$ of the gap G is equal to about 0.25 g/cc. For a gap equal to about 8 mm, it is believed that the resilient non-intumescent layer 12 can have a minimum basis weight of about 2000 g/m², the intumescent layer 20 can have a minimum basis weight of about 1800 g/m², and wherein the density of the combined non-intumescent layer 12 and intumescent layer 20 in the mount area $A_M$ of the gap G is equal to about 0.475 g/cc and the density of outer portions 18A, 18B of the non-intumescent layer 12 in the seal areas $A_S$ of the gap G is equal to about 0.25 g/cc. In each of the prophetic examples set out above, in the mount area $A_M$ of the gap G where both the intumescent and non-intumescent layers 20 and 12 are positioned, it is believed that the intumescent layer 20 will fill approximately 25% of the gap, while the non-intumescent layer 12 will fill about 75% of the gap. It is believed that the outer portions 18A, 18B of the non-intumescent layer 12 in the seal areas $A_S$ of the gap G, if provided at a minimum density of about 0.25 g/cc, will function in an acceptable manner to insulating the intumescent layer 20 from exposure to exhaust gases.

Figure 13:
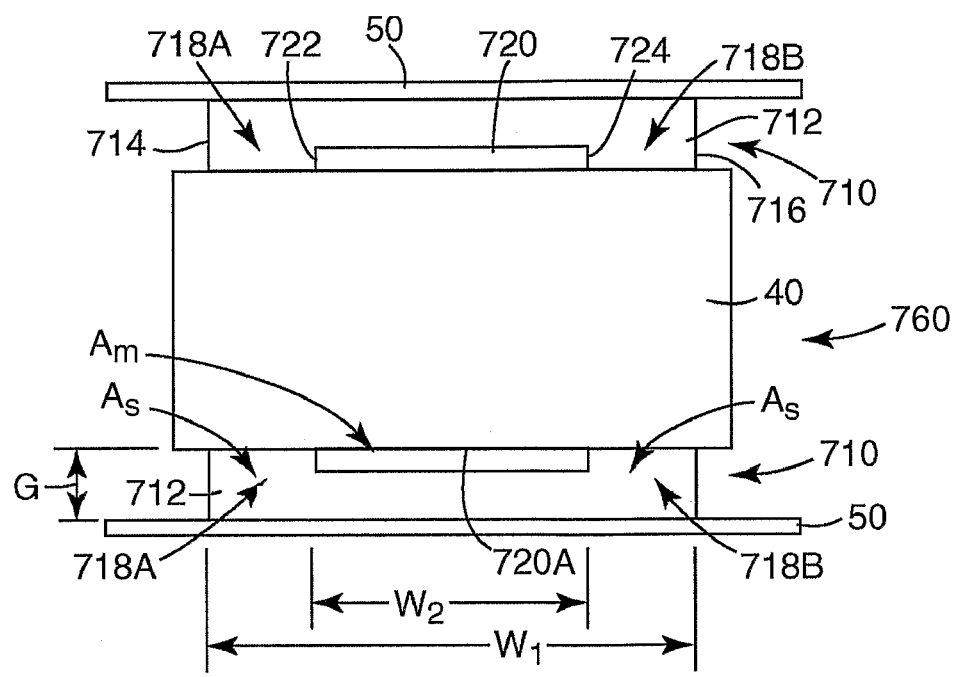
FIG. 13 is a schematic cross sectional view of a catalytic converter including a multilayer mat formed in accordance with a second embodiment.

It is contemplated that the mat 10 illustrated in FIGS. 1-2 may also be used in low temperature applications. Such a multilayer mat 710, in accordance with a second embodiment, is illustrated in FIG. 13. The mat 710 comprises a non-intumescent layer 712 comprising ceramic fibers and has a width $W_1$ defined by opposite lateral edges 714 and 716 and a length $L_1$. The mat 710 further comprises an intumescent layer 720 comprising intumescent material and has a width $W_2$ defined by opposite lateral edges 722 and 724 and a length $L_2$. In the illustrated embodiment, the width $W_2$ of the intumescent layer 720 is less than the width $W_1$ of the non-intumescent layer 712. Further, the intumescent layer 720 is positioned relative to the non-intumescent layer such that its two lateral edges 722 and 724 are positioned within the two lateral edges 714 and 716 of the non-intumescent layer 712. As illustrated in FIG. 13, the intumescent layer 720 comprises an exposed major surface 720A having an area defined by its width $W_2$ times its length $L_2$. The major surface 720A also defines an innermost layer of the mat 710.

As illustrated in FIG. 13, the mat 710 is positioned so as to mount a pollution control element, such as a catalyst support element 40, in a metal housing 50. The catalyst support element 40, mat 710 and metal housing 50 define a catalytic converter 760.

Preferably, a substantially resilient non-intumescent layer 712 is selected such that once the mat 710 and the catalyst support element 40 have been mounted within the metal housing 50, outer portions 718A and 718B of the non-intumescent layer 712 sufficiently expand in the seal areas $A_S$ of a gap G, between an inner wall of the housing 50 and the support element 40, so as to seal the lateral edges 722 and 724 of the intumescent layer 720, as the gap G expands with increasing temperatures. Thus, the outer portions 718A and 718B continue to fill the gap G when at ambient temperature or a high operational temperature. In other words, at least the outer portions 718A and 718B of the non-intumescent layer 712 are resilient enough to exert a sufficient pressure to seal the gap G and protect the intumescent layer 720, whether the gap G is at its smallest (i.e., at ambient temperature) or biggest (i.e., at the highest operating temperature). It is desirable for at least these outer portions 718A and 718B to also be durable enough to survive cycling of the gap G between its smallest and biggest over the desired life of the pollution control device. It can be preferable for the entire non-intumescent layer 712 to exhibit this degree of resilience and durability. Hence, the intumescent layer lateral edges 722 and 724 are substantially sealed from exposure to high or low temperature exhaust gases flowing through the catalytic converter 760.

Figure 3:
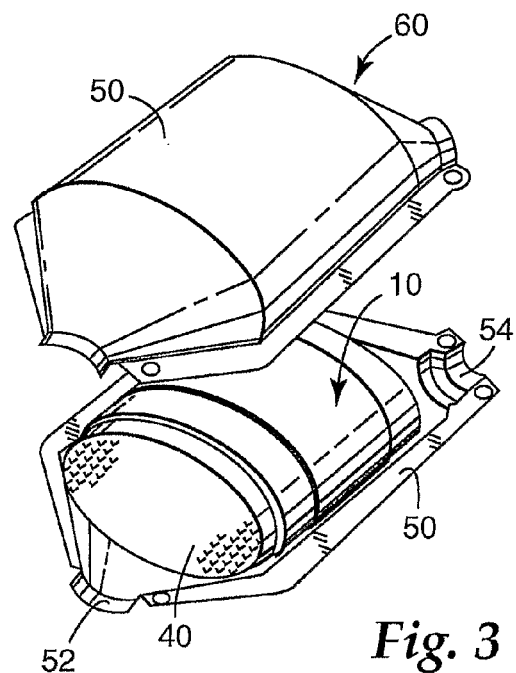
FIG. 3 is a perspective exploded view of a catalytic converter including the mat illustrated in FIG. 1.

In the pollution control device 60 of FIGS. 3-4, the intumescent layer 20 forms an outermost layer of the mat 10. Hence, the mat 10 is advantageous for use in mounting a pollution control element in a pollution control device that operates at high temperatures such that the intumescent layer 20 faces and makes contact with the pollution control device metal housing. As a result, energy in the form of heat is transferred efficiently from the intumescent layer 20 to the metal housing so as to help protect the intumescent layer 20 from overheating, when exposed to high temperatures. The intumescent layer 20 is also protected from high temperatures radiated by the element 40 via the non-intumescent layer 12. In the pollution control device 760 of FIG. 13, the intumescent layer 720 forms an innermost layer of the mat 710. Hence, the mat 710 is advantageous for use in mounting a pollution control element, such as element 40, in a pollution control device that operates at relatively low temperatures such that the intumescent layer 720 faces and makes contact with the pollution control element so that the intumescent layer 720 receives sufficient energy in the form of heat to cause the layer 720 to intumescently expand to the degree desired.

Figure 4A:
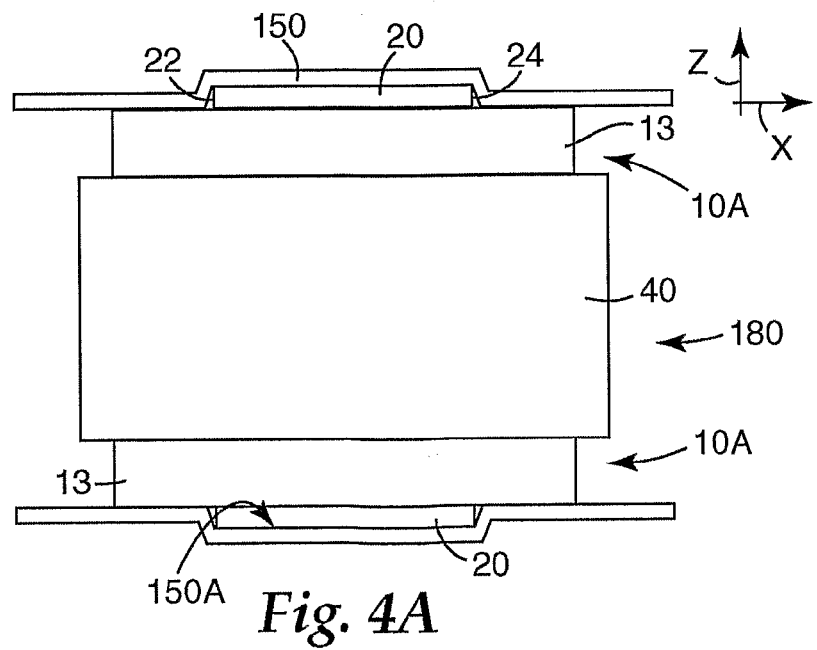
FIG. 4A is a schematic cross sectional view of a catalytic converter including a metal housing with a recess and multilayer mat formed in accordance with a third embodiment.

In a third embodiment, where like reference numerals indicate like elements, a mat 10A is used to support and mount a support element 40 in a metal housing 150 so as to define a catalytic converter 180, see FIG. 4A. The metal housing 150 is rolled or otherwise formed so as to include a recess 150A, which, in the illustrated embodiment, extends about the entirety of the housing 150. By forming the recess 150A within the housing 150, the stiffness of the housing is enhanced. The housing recess 150A is shaped in X and Z directions so as to define a pocket sized to receive the intumescent layer 20 and shaped to substantially shield the intumescent layer lateral edges 22 and 24 from exhaust gases passing through the catalytic converter 180. Because the gap $G_A$ does not accommodate the thickness of both the intumescent layer 20 and the non-intumescent layer 13, the layer 13 does not need to expand as much to sufficiently fill the gap $G_A$, as the gap increases with increasing temperature. As a result, the non-intumescent layer 13 in the FIG. 4A embodiment may be formed from a material having less resiliency than the material used to form the non-intumescent layer 12 in the FIG. 4 embodiment. For example, the non-intumescent layer 13 may be formed from a material commercially available from 3M Company (St. Paul, Minn.) under the trade designation "INTERAM 900HT."

Figure 5:
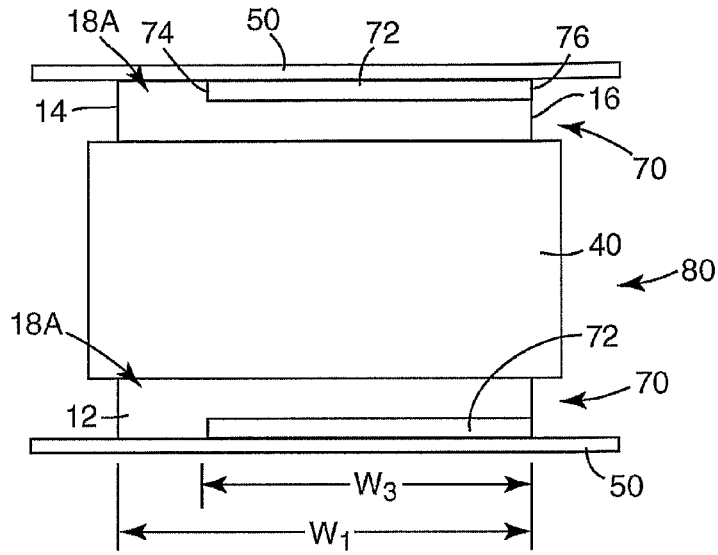
FIG. 5 is a schematic cross sectional view of a catalytic converter including a multilayer mat formed in accordance with a fourth embodiment.

A multilayer mat 70 constructed in accordance with a fourth embodiment is illustrated in FIG. 5, where like reference numerals indicate like elements. The mat 70 comprises a non-intumescent layer 12 comprising ceramic fibers and has a width $W_1$ defined by opposite lateral edges 14 and 16 and a length $L_1$. The mat 10 further comprises an intumescent layer 72 comprising intumescent material and has a width $W_3$ defined by opposite lateral edges 74 and 76 and a length substantially equal to length $L_1$ of the non-intumescent layer 12. In the illustrated embodiment, the width $W_3$ of the intumescent layer 72 is less than the width $W_1$ of the non-intumescent layer 12. Further, the intumescent layer 72 is positioned relative to the non-intumescent layer 12 such that lateral edge 74 is positioned within the two lateral edges 14 and 16 of the non-intumescent layer 12 and lateral edge 76 is substantially in-line with lateral edge 16.

In FIG. 5, the mat 70 is shown provided within a metal housing 50 so as to support and maintain a catalyst support element 40 within the housing 50. The mat 70, housing 50 and support element 40 define a catalytic converter 80. Exhaust gases pass through the catalytic converter 80 from left to right as viewed in FIG. 5.

Preferably, a substantially resilient non-intumescent layer 12 is selected for use in the catalytic converter 80 such that once the mat 70 and the catalyst support element 40 are positioned within the metal housing 50, an outer or exposed portion 18A of the non-intumescent layer 12 fills the gap G so as to seal and protect the lateral edge 74 of the intumescent layer 72. Hence, the intumescent layer lateral edge 74 is substantially sealed from direct exposure to high temperature exhaust gases flowing through the catalytic converter 80. It is noted that in the FIG. 5 embodiment, the other lateral edge 76 of the intumescent layer 72 is not sealed by the non-intumescent layer 12. However, because the lateral edge 76 is not directly exposed to the incoming flow of the exhaust gases, loss of intumescent material from lateral edge 76 may -be minimal or insubstantial for some catalytic converter designs such as, for example, substantially round housing designs.

The non-intumescent layer 12 may be formed from one of the same materials, set out above, from which the layer 12 in the FIG. 1 embodiment is formed. The intumescent layer 72 may be formed from one of the same intumescent materials, set out above, from which the layer 20 in the FIG. 1 embodiment is formed.

In the FIG. 5 embodiment, the intumescent layer 72 is shown positioned adjacent to the catalytic converter metal housing 50. However, for some applications, such as low temperature applications, the intumescent layer 72 may be positioned adjacent to the catalyst support element 40.

Figure 5A:
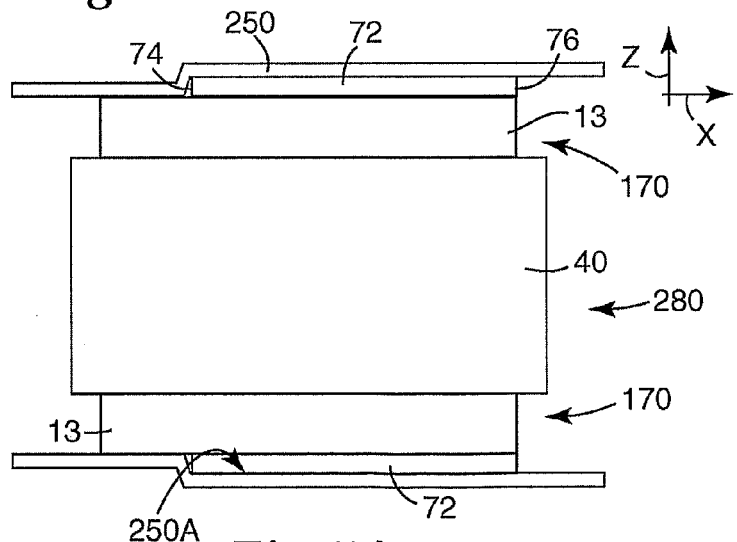
FIG. 5A is a schematic cross sectional view of a catalytic converter including a multilayer mat formed in accordance with a fifth embodiment.

In a fifth embodiment, where like reference numerals indicate like elements, a mat 170 is used to support and mount a support element 40 in a metal housing 250 so as to define a catalytic converter 280, see FIG. 5A. The metal housing 250 is formed so as to include a recess 250A, which, in the illustrated embodiment, extends about the entirety of the housing 250. The housing recess 250A is shaped in X and Z directions so as to receive the intumescent layer 72 and substantially shield the intumescent layer lateral edge 74 from exhaust gases passing through the catalytic converter 280. Hence, the intumescent layer lateral edge 74 is substantially sealed from direct exposure to incoming high temperature exhaust gases flowing through the catalytic converter 280. It is noted that in the FIG. 5A embodiment, the lateral edge 76 of the intumescent layer 72 is not sealed by the non-intumescent layer 13. However, because the lateral edge 76 is not positioned in the incoming path of the exhaust gases, loss of intumescent material from lateral edge 76 may be minimal for some catalytic converter housing designs. It is also noted that because the non-intumescent layer 13 does not need to expand as substantially in the Z direction to shield the lateral edges 74 and 76 of the intumescent layer 72 from exhaust gases, the non-intumescent layer 13 in the FIG. 5A embodiment may be formed from a material having less resiliency than the material used to form the non-intumescent layer 12 in the FIG. 5 embodiment. For example, the non-intumescent layer 13 may be formed from the same non-intumescent material, set out above, from which the non-intumescent layer 13 in the FIG. 4A embodiment is formed.

Figure 6:
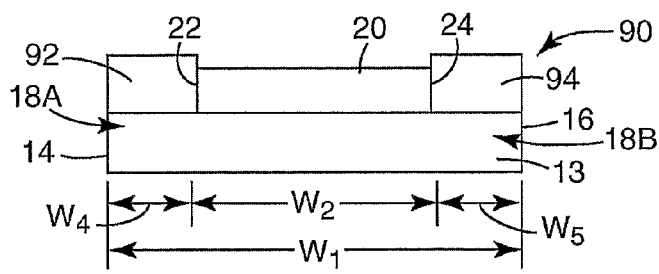
FIG. 6 is a schematic cross sectional view of a multilayer mat formed in accordance with a sixth embodiment.

A multilayer mat 90 constructed in accordance with a sixth embodiment is illustrated in FIG. 6, where like reference numerals indicate like elements. The mat 90 comprises an inner non-intumescent layer 13 comprising ceramic fibers and has a width $W_1$ defined by opposite lateral edges 14 and 16 and a length $L_1$. The mat 10 further comprises an intumescent layer 20 comprising intumescent material and has a width $W_2$ defined by opposite lateral edges 22 and 24 and a length substantially equal to length $L_1$ of the non-intumescent layer 13. In the illustrated embodiment, the width $W_2$ of the intumescent layer 20 is less than the width $W_1$ of the non-intumescent layer 13. Further, the intumescent layer 20 is positioned relative to the non-intumescent layer 13 such that the lateral edges 22 and 24 are positioned within the two lateral edges 14 and 16 of the non-intumescent layer 13.

The multilayer mat 90 further comprises first and second strips 92 and 94, respectively, of non-intumescent material. The first non-intumescent strip 92 is positioned over a first outer portion 18A of the non-intumescent layer 13 and the second non-intumescent strip 94 is positioned over a second outer portion 18B of the non-intumescent layer 13. The first non-intumescent strip 92 has a width $W_4$ and a length substantially equal to the lengths of the inner non-intumescent layer 13 and the intumescent layer 20. The second non-intumescent strip 94 has a width $W_5$ and a length substantially equal to the lengths of the inner non-intumescent layer 13 and the intumescent layer 20. In the illustrated embodiment, the summation of the width $W_2$ of the intumescent layer 20, the width $W_4$ of the first non-intumescent strip 92 and the width $W_5$ of the second non-intumescent strip 94 is substantially equal to the width $W_1$ of the inner non-intumescent layer 13.

Figure 7:
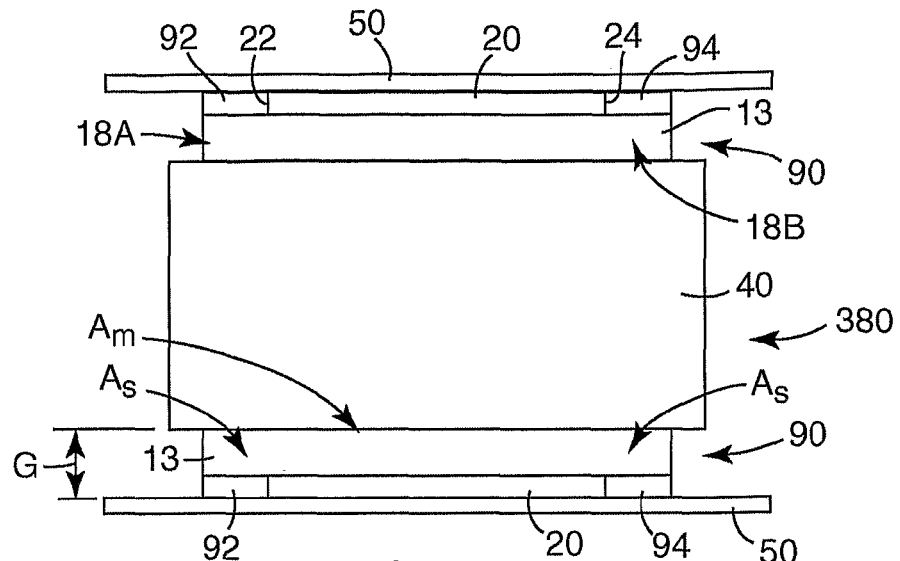
FIG. 7 is a schematic cross sectional view of a catalytic converter including the mat of FIG. 6.

In FIG. 7, the mat 90 is shown provided within a metal housing 50 so as to support and maintain a catalyst support element 40 within the housing 50. The mat 90, housing 50 and support element 40 define a catalytic converter 380.

Preferably, the non-intumescent strips 92 and 94 are formed from a substantially resilient non-intumescent material for use in the catalytic converter 380 such that once the mat 90 and the catalyst support element 40 are positioned within the metal housing 50, the strips 92 and 94 sufficiently expand in seal areas $A_S$ of a gap G, between an inner wall of the housing 50 and the support element 40, see FIG. 7, so as to seal the lateral edges 22 and 24 of the intumescent layer 20, as the gap G expands with increasing temperatures. In other words, at least the strips 92 and 94 are resilient enough to exert a sufficient pressure to seal the gap G and protect the lateral edges 22 and 24 of the intumescent layer, whether the gap G is at its smallest (i.e., at ambient temperature) or biggest (i.e., at the highest operating temperature). It is desirable for at least these strips 92 and 94 to also be durable enough to survive cycling of the gap G between its smallest and biggest over the desired life of the pollution control device. It can be preferable for the non-intumescent layer 13 to also exhibit this degree of resilience and durability. Hence, the intumescent layer lateral edges 22 and 24 are substantially sealed from exposure to high temperature exhaust gases flowing through the catalytic converter 380. It is noted that the inner non-intumescent layer 13 may be formed from a material which is less resilient than the non-intumescent strips 92 and 94. Typically, a less resilient non-intumescent material is less expensive than a more resilient non-intumescent material. For example, the non-intumescent strips 92 and 94 may be formed from one of the same materials, set out above, from which the layer 12 in the FIG. 1 embodiment is formed. The intumescent layer 72 may be formed from one of the same intumescent materials, set out above, from which the intumescent layer 20 in the FIG. 1 embodiment is formed. The non-intumescent layer 13 may be formed from the same non-intumescent material, set out above, from which the non-intumescent layer 13 in the FIG. 4A embodiment is formed.

It is also contemplated that the non-intumescent strips 92 and 94 may be formed from a less resilient non-intumescent material while the non-intumescent layer 13 may be formed from a substantially resilient non-intumescent material. In this embodiment, once the mat and the catalyst support element 40 are positioned within the metal housing 50, the non-intumescent layer 13 provides the resiliency needed to seal areas $A_S$ of the gap G between the inner wall of the housing 50 and the support element 40 so as to protect the lateral edges 22 and 24 of the intumescent layer 20 during low and high operating temperatures of the pollution control device.

For a catalytic converter 380 having a mat 90 comprising a non-intumescent layer 13 formed from "INTERAM 900HT," an intumescent layer 20 formed from "INTERAM 100" or "INTERAM 550" and non-intumescent strips 92, 94 formed from "INTERAM 1100HT," "INTERAM 1101HT," "INTERAM 1535HT," or "INTERAM 1600HTE" and having a gap G between an inner wall of the housing 50 and the support element 40, see FIG. 7, equal to about 3 mm, it is believed that the non-intumescent layer 13 may have a minimum basis weight of about 750 g/m$^2$, the intumescent layer 20 may have a minimum basis weight of about 1550 g/m$^2$, and each non-intumescent strip 92 and 94 may have a minimum basis weight of about 450 g/m$^2$ and wherein the compressed density of the combined non-intumescent layer 13 and intumescent layer 20 in a mount area $A_M$ of the gap G is about 0.77 g/cc and the compressed density of the combined non-intumescent layer 13 and a strip 92 or 94 in each seal area $A_S$ of the gap G is equal to about 0.40 g/cc. For a gap equal to about 4 mm, it is believed that the non-intumescent layer 13 may have a minimum basis weight of about 1020 g/m$^2$, the intumescent layer 20 may have a minimum basis weight of about 2100 g/m$^2$, and each non-intumescent strip 92 and 94 may have a minimum basis weight of about 600 g/m$^2$ and wherein the compressed density of the combined non-intumescent layer 13 and intumescent layer 20 in the mount area $A_M$ of the gap G is about 0.77 g/cc and the compressed density of the combined non-intumescent layer 13 and a strip 92 or 94 in each seal area $A_S$ of the gap G is equal to about 0.40 g/cc. For a gap equal to about 6 mm, it is believed that the non-intumescent layer 13 may have a minimum basis weight of about 1435 g/m$^2$, the intumescent layer 20 may have a minimum basis weight of about 3100 g/m$^2$, and each non-intumescent strip 92 and 94 may have a minimum basis weight of about 900 g/m$^2$ and wherein the compressed density of the combined non-intumescent layer 13 and intumescent layer 20 in the mount area $A_M$ of the gap G is about 0.77 g/cc and the compressed density of the combined non-intumescent layer 13 and a strip 92 or 94 in each seal area $A_S$ of the gap G is equal to about 0.40 g/cc. For a gap equal to about 8 mm, it is believed that the non-intumescent layer 13 may have a minimum basis weight of about 2000 g/m$^2$, the intumescent layer 20 may have a minimum basis weight of about 4695 g/m$^2$, and each non-intumescent strip 92 and 94 may have a minimum basis weight of about 1200 g/m$^2$ and wherein the compressed density of the combined non-intumescent layer 13 and intumescent layer 20 in the mount area $A_M$ of the gap G is about 0.77 g/cc and the compressed density of the combined non-intumescent layer 13 and a strip 92 or 94 in each seal area $A_S$ of the gap G is equal to about 0.40 g/cc. In each of the prophetic examples set out above, in the mount area $A_M$ of the gap G where the intumescent and non-intumescent layers 20 and 13 are positioned, it is believed that the intumescent layer 20 will fill approximately 60% of the gap G, and the non-intumescent layer 13 will fill about 40% of the gap G. In each of the prophetic examples set out above, in the seal areas $A_S$ of the gap G where the non-intumescent layer 13 and a non-intumescent strip 92 or 94 are positioned, it is believed that the non-intumescent layer 13 will fill approximately 60% of the gap, and the non-intumescent strip 92 or 94 will fill approximately 40% of the gap G.

In the FIG. 7 embodiment, the intumescent layer 20 is shown positioned adjacent to the catalytic converter metal housing 50. However, for some applications, such as low temperature applications, the intumescent layer 20 may be positioned adjacent to the catalyst support element 40. In such an embodiment, the non-intumescent strips 92, 94 may also be positioned adjacent to the catalyst support element 40.

Figure 8:
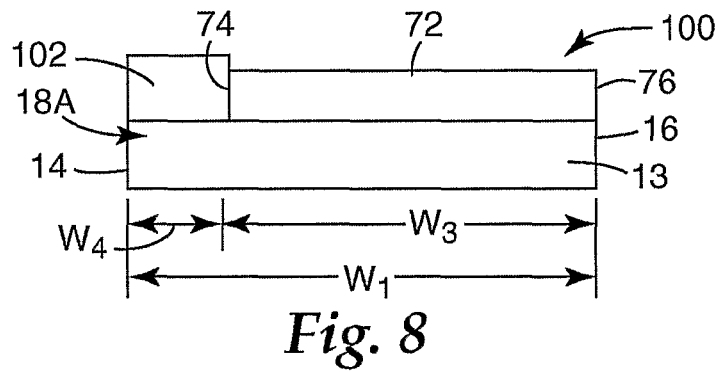
FIG. 8 is a schematic cross sectional view of a multilayer mat formed in accordance with a seventh embodiment.

A multilayer mat 100 constructed in accordance with a seventh embodiment is illustrated in FIG. 8, where like reference numerals indicate like elements. The mat 100 comprises an inner non-intumescent layer 13 comprising ceramic fibers and has a width $W_1$ defined by opposite lateral edges 14 and 16 and a length $L_1$. The mat 100 further comprises an intumescent layer 72 comprising intumescent material and has a width $W_3$ defined by opposite lateral edges 74 and 76 and a length substantially equal to length $L_1$ of the non-intumescent layer 13. In the illustrated embodiment, the width $W_3$ of the intumescent layer 72 is less than the width $W_1$ of the non-intumescent layer 13. Further, the intumescent layer 72 is positioned relative to the non-intumescent layer 13 such that lateral edge 74 is positioned within the two lateral edges 14 and 16 of the non-intumescent layer 13 and lateral edge 76 is substantially in-line with lateral edge 16.

The multilayer mat 100 further comprises a strip 102 of non-intumescent material. The non-intumescent strip 102 is positioned over a first outer portion 18A of the non-intumescent layer 13. The non-intumescent strip 102 has a width $W_4$ and a length substantially equal to length $L_1$ of the inner non-intumescent layer 13. In the illustrated embodiment, the summation of the width $W_3$ of the intumescent layer 72 and the width $W_4$ of the non-intumescent strip 102 is substantially equal to the width $W_1$ of the inner non-intumescent layer 13.

Figure 9:
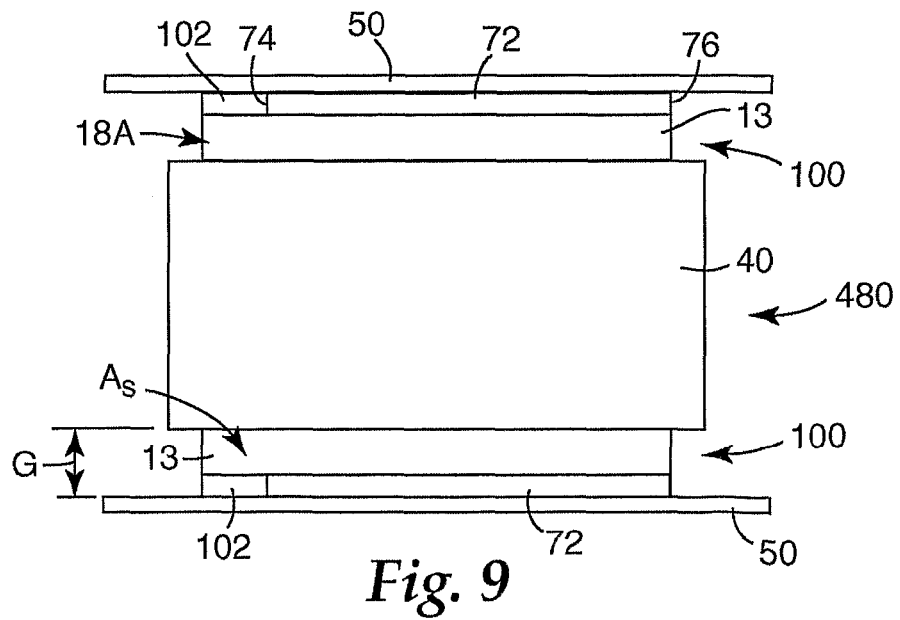
FIG. 9 is a schematic cross sectional view of a catalytic converter including the mat of FIG. 8.

In FIG. 9, the mat 100 is shown provided within a metal housing 50 so as to support and maintain a catalyst support element 40 within the housing 50. The mat 100, housing 50 and support element 40 define a catalytic converter 480.

The non-intumescent strip 102 can be formed from a substantially resilient non-intumescent material for use in the catalytic converter 480 such that once the mat 100 and the catalyst support element 40 are positioned within the metal housing 50, the strip 102 sufficiently expands in a seal area $A_S$ of a gap G, between an inner wall of the housing 50 and the support element 40, see FIG. 9, so as to seal the lateral edge 74 of the intumescent layer 72, as the gap G expands with increasing temperatures. In other words, at least the strip 102 is resilient enough to exert a sufficient pressure to seal the gap G and protect the lateral edge 74 of the intumescent layer 72, whether the gap G is at its smallest (i.e., at ambient temperature) or biggest (i.e., at the highest operating temperature). It is desirable for at least the strip 102 to also be durable enough to survive cycling of the gap G between its smallest and biggest over the desired life of the pollution control device. It can be preferable for the non-intumescent layer 13 to also exhibit this degree of resilience and durability. Hence, the intumescent layer lateral edge 74 is substantially sealed from direct exposure to high temperature exhaust gases flowing through the catalytic converter 480. It is noted that the inner non-intumescent layer 13 may be formed from a material which is less resilient than the non-intumescent strip 102. For example, the non-intumescent strip 102 may be formed from one of the same materials, set out above, from which the layer 12 in the FIG. 1 embodiment is formed. The intumescent layer 72 may be formed from one of the same intumescent materials, set out above, from which the intumescent layer 20 in the FIG. 1 embodiment is formed. The non-intumescent layer 13 may be formed from the same non-intumescent material, set out above, from which the non-intumescent layer 13 in the FIG. 4A embodiment is formed.

It is noted that in the FIG. 9 embodiment, the lateral edge 76 of the intumescent layer 72 is not sealed by the non-intumescent layer 13. However, because the lateral edge 76 is not positioned in the incoming path of the exhaust gases, loss of intumescent material from lateral edge 76 may be minimal for some catalytic converter designs.

In the FIG. 9 embodiment, the intumescent layer 72 is shown positioned adjacent to the catalytic converter metal housing 50. However, for some applications, such as low temperature applications, the intumescent layer 72 may be positioned adjacent to the catalyst support element 40. In such an embodiment, the non-intumescent strip 102 may also be positioned adjacent to the catalyst support element 40.

Figure 10:
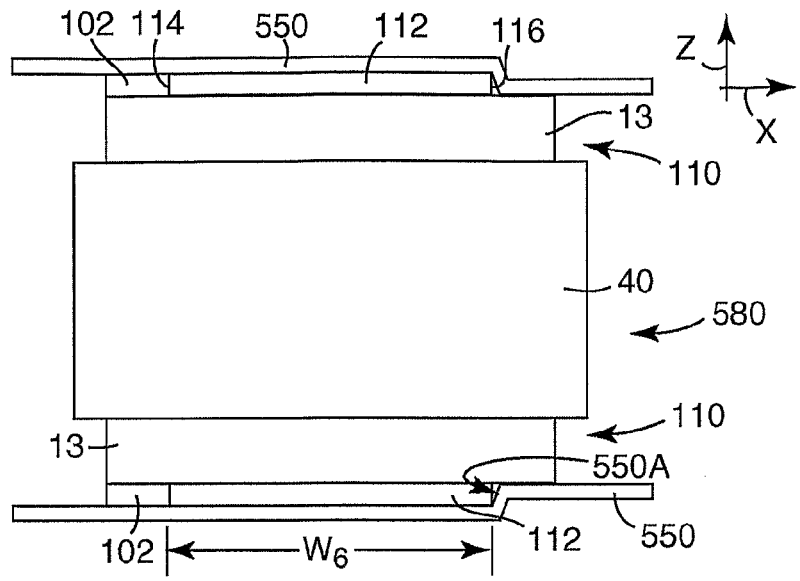
FIG. 10 is a schematic cross sectional view of a catalytic converter including a multilayer mat formed in accordance with an eighth embodiment.

A multilayer mat 110 constructed in accordance with an eighth embodiment is illustrated in FIG. 10, where like reference numerals indicate like elements. The mat 110 is similar to mat 100 illustrated in FIGS. 8 and 9, except that the width $W_6$ of an intumescent layer 112 is less than the width $W_3$ of the intumescent layer 72 in the FIG. 8 embodiment. The intumescent layer 112 has lateral edges 114 and 116. As illustrated in FIG. 10, the intumescent layer 112 defines an outermost layer and is positioned adjacent to the non-intumescent layer 13.

The mat 110 is used to support and mount a support element 40 in a metal housing 550 so as to define a catalytic converter 580, see FIG. 10. The metal housing 550 is formed so as to include a recess 550A, which, in the illustrated embodiment, extends circumferentially about the entirety of the housing 550. The housing recess 550A is shaped in X and Z directions so as to receive the intumescent layer 112 and substantially shield the intumescent layer lateral edge 116 from exhaust gases passing through the catalytic converter 580 in a left to right direction as viewed in FIG. 10. Hence, the intumescent layer lateral edge 116 is substantially sealed from exposure to high temperature exhaust gases flowing through the catalytic converter 580.

As in the FIG. 8 embodiment, the non-intumescent strip 102 is formed from a substantially resilient non-intumescent material for use in the catalytic converter 580 such that once the mat 110, and the catalyst support element 40 are positioned within the metal housing 550, the strip 102 sufficiently expands in a gap between the support element 40 and an inner wall of the housing 550 so as to seal the lateral edge 114 of the intumescent layer 112, as the gap expands with increasing temperatures. In other words, at least the strip 102 is resilient enough to exert a sufficient pressure to seal the gap G and protect the lateral edge 114 of the intumescent layer 112, whether the gap G is at its smallest (i.e., at ambient temperature) or biggest (i.e., at the highest operating temperature). It is desirable for at least the strip 102 to also be durable enough to survive cycling of the gap G between its smallest and biggest over the desired life of the pollution control device. It can be preferable for the non-intumescent layer 13 to also exhibit this degree of resilience and durability. Hence, the intumescent layer lateral edge 114 is substantially sealed from direct exposure to incoming high temperature exhaust gases flowing through the catalytic converter 580. The intumescent layer 112 may be formed from one of the same intumescent materials, set out above, from which the intumescent layer 20 in the FIG. 1 embodiment is formed. The non-intumescent layer 13 may be formed from the same non-intumescent material, set out above, from which the non-intumescent layer 13 in the FIG. 4A embodiment is formed. The non-intumescent strip 102 may be formed from one of the same materials, set out above, from which the layer 12 in the FIG. 1 embodiment is formed.

Figure 11:
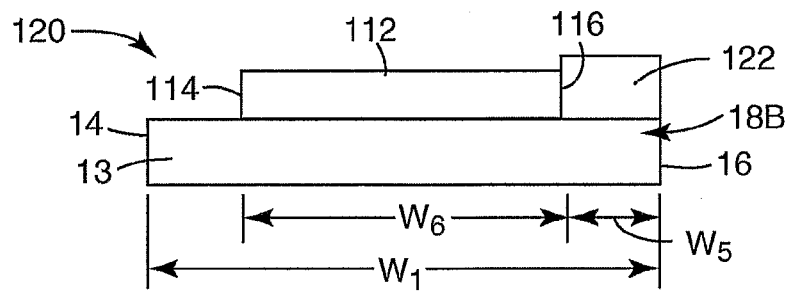
FIG. 11 is a schematic cross sectional view of a multilayer mat formed in accordance with a ninth embodiment.

A multilayer mat 120 constructed in accordance with an ninth embodiment is illustrated in FIG. 11, where like reference numerals indicate like elements. The mat 120 comprises an inner non-intumescent layer 13 comprising ceramic fibers and has a width $W_1$ defined by opposite lateral edges 14 and 16 and a length $L_1$. The mat 120 further comprises an intumescent layer 112 comprising intumescent material and having a width $W_6$ defined by opposite lateral edges 114 and 116 and a length substantially equal to length $L_1$ of the non-intumescent layer 13. In the illustrated embodiment, the width $W_6$ of the intumescent layer 112 is less than the width $W_1$ of the non-intumescent layer 13. Further, the intumescent layer 112 is positioned relative to the non-intumescent layer 13 such that the lateral edges 114 and 116 are positioned within the two lateral edges 14 and 16 of the non-intumescent layer 13.

The multilayer mat 120 further comprises a strip 122 of non-intumescent material. The non-intumescent strip 122 is positioned over an outer portion 18B of the non-intumescent layer 13. The non-intumescent strip 122 has a width $W_5$ and a length substantially equal to the lengths of the inner non-intumescent layer 13 and the intumescent layer 112.

Figure 12:
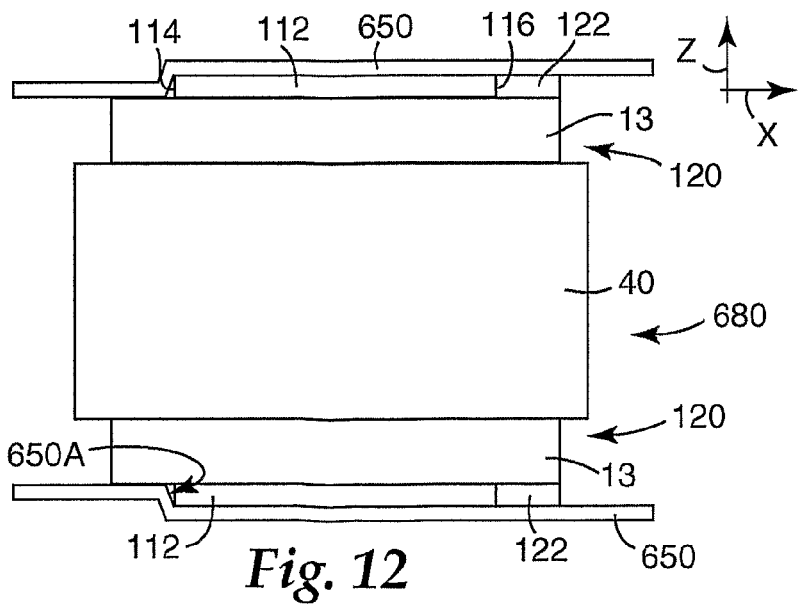
FIG. 12 is a schematic cross sectional view of a catalytic converter including the mat of FIG. 11.

In FIG. 12, the mat 120 is shown provided within a metal housing 650 so as to support and maintain a catalyst support element 40 within the housing 650. The mat 120, housing 650 and support element 40 define a catalytic converter 680.

Preferably, the non-intumescent strip 122 is formed from a substantially resilient non-intumescent material for use in the catalytic converter 680 such that once the mat 120 and the catalyst support element 40 are positioned within the metal housing 650, the strip 122 sufficiently expands in a gap between the support element 40 and an inner wall of the housing 650 so as to seal the lateral edge 116 of the intumescent layer 112, as the gap expands with increasing temperatures. In other words, at least the strip 122 is resilient enough to exert a sufficient pressure to seal the gap G and protect the lateral edge 16 of the intumescent layer 112, whether the gap G is at its smallest (i.e., at ambient temperature) or biggest (i.e., at the highest operating temperature). It is desirable for at least the strip 122 to also be durable enough to survive cycling of the gap G between its smallest and biggest over the desired life of the pollution control device. It can be preferable for the non-intumescent layer 13 to also exhibit this degree of resilience and durability. Hence, the intumescent layer lateral edge 116 is substantially sealed from exposure to high temperature exhaust gases flowing through the catalytic converter 680.

The metal housing 650 is formed so as to include a recess 650A, which, in the illustrated embodiment, extends about the entirety of the housing 650, see FIG. 12. The housing recess 650A is shaped in X and Z directions so as to receive the intumescent layer 112 and substantially shield the intumescent layer lateral edge 114 from exhaust gases passing through the catalytic converter 680. Hence, the intumescent layer lateral edge 114 is substantially sealed from direct exposure to incoming high temperature exhaust gases flowing through the catalytic converter 680. The intumescent layer 112 may be formed from one of the same intumescent materials, set out above, from which the intumescent layer 20 in the FIG. 1 embodiment is formed. The non-intumescent layer 13 may be formed from the same non-intumescent material, set out above, from which the non-intumescent layer 13 in the FIG. 4A embodiment is formed. The non-intumescent strip 122 may be formed from one of the same materials, set out above, from which the layer 12 in the FIG. 1 embodiment is formed.

It is noted that the multilayer mats, set out above, may alternatively be used to secure a pollution control element such as a filter element within a housing of an exhaust filter or trap. It is further noted that such pollution control devices, according to the present invention, can be used in the exhaust system of an internal combustion engine (e.g., a vehicle exhaust system, a power generator exhaust system).

The multilayer mats are typically flexible. The mats usually can be handled and wrapped around a pollution control element in a pollution control device without breaking or cracking. When wrapped around a pollution control element, the ends of the multilayer mat can meet in a variety of junctions as discussed in pending U.S. patent application Ser. No. 10/824,029, entitled "SANDWICH HYBRID MOUNTING MAT," and filed on Apr. 14, 2004, the disclosure of which is incorporated herein by reference.

As noted above, the non-intumescent layer 12 and non-intumescent strips 102 and 122 may be more resilient than the non-intumescent layer 13. Further, the non-intumescent strips 92 and 94 may-be more resilient than the non-intumescent layer 13 or vice versa. Hence, the non-intumescent layer 13 may be formed from a material having a different composition from a material used to form the non-intumescent layer 12 and non-intumescent strips 92, 94, 102, 122.

Each non-intumescent layer or strip contains inorganic fibers. Any inorganic fiber that is known to be suitable for use in a mounting mat for a pollution control device can be selected. For example, the inorganic fibers can be alumina fibers, mullite fibers, quartz fibers, silicon carbide fibers, silicon nitride fibers, metal fibers, aluminosilicate fibers, magnesium aluminosilicate fibers, aluminoborosilicate fibers, zirconia fibers, titania fibers, and the like. The fibers can be amorphous, crystalline, or a combination thereof.

Quartz fibers are commercially available under the trade designation "ASTROQUARTZ" from J. P. Stevens, Inc. (Slater, N.C.). Silicon carbide fibers are commercially available from Nippon Carbon (Tokyo, Japan) under the trade designation "NICALON" or from Textron Specialty Materials (Lowell, Mass.) under the trade designation "TYRANNO". Silicon nitride fibers are commercially available from Toren Energy International Corp. (New York, N.Y.).

Metal fibers are commercially available from Beckaert (Zweregan, Belgium) under the trade designation "BEKI-SHELD GR 90/C2/4" and from Ribbon Technology Corp. (Gahana, Ohio) under the trade designation "RIBTEC".

In some embodiments of the non-intumescent layer(s) or strip(s), the inorganic fibers are glass fibers. As used herein, the term "glass fibers" refers to inorganic fibers that are prepared from an inorganic fusion material that has been cooled without substantial crystallization. The glass fibers are amorphous as determined using either x-ray diffraction or transmission electron microscopic techniques. The glass fibers, at least in some applications, are shot free (i.e., the fibers contain no greater than 5 weight percent shot, no greater than 3 weight percent shot, no greater than 2 weight percent shot, no greater than 1 weight percent shot, or no greater than 0.5 weight percent shot). As used herein, the term "shot" refers to non-fibrous particles that can be a by-product of some inorganic fiber formation processes.

Suitable glass fibers are often magnesium aluminosilicate fibers. Such glass fibers can contain at least 50 weight percent $SiO_2$, at least 8 weight percent $Al_2O_3$, and at least 1 weight percent magnesium oxide. For example, magnesium aluminosilicate fibers can contain 50 to 70 weight percent, 50 to 60 weight percent, 60 to 70 weight percent, or 55 to 65 weight percent $SiO_2$; 8 to 30 weight percent, 10 to 20 weight percent, or 20 to 30 weight percent $Al_2O_3$; and 1 to 15 weight percent, 1 to 12 weight percent, 1 to 10 weight percent, or 1 to 8 weight percent magnesium oxide. Additional oxides can be present such as sodium oxide, potassium oxide, boron oxide, calcium oxide, and the like.

Specific examples of magnesium aluminosilicate glass fibers are E-glass fibers, S-glass-fibers, S2-glass fibers, and R-glass fibers. E-glass fibers often contain about 55 weight percent $SiO_2$, about 11 weight percent $Al_2O_3$, about 6 weight percent $B_2O_3$, about 18 weight percent CaO, about 5 weight percent MgO, and about 5 weight percent other oxides. S-glass and S2-glass fibers typically contain about 65 weight percent $SiO_2$, about 25 weight percent $Al_2O_3$, and about 10 weight percent MgO. R-glass fibers usually contain about 60 weight percent $SiO_2$, about 25 weight percent $Al_2O_3$, about 9 weight percent CaO, and about 6 weight percent MgO. E-glass fibers, S-glass fibers, and S2-glass fibers are commercially available from Advanced Glassfiber Yarns, LLC (Aiken, S.C.) and Owens-Corning Fiberglass Corp. (Granville, Ohio). R-glass fibers are commercially available from Saint-Gobain Vetrotex (Herzogenrath, Germany).

Various refractory ceramic fibers can be used in the non-intumescent layer(s) or strip(s). In some embodiments, the ceramic fibers are amorphous and contain mainly $Al_2O_3$ and $SiO_2$. Small amounts of other oxides can be present. The weight ratio of $Al_2O_3$ to $SiO_2$ ($Al_2O_3$:$SiO_2$) is usually greater than or equal to 20:80, 30:70, 35:65, 40:60.45:55, 50:50, 55:45, 60:40, or 70:30. The ceramic fibers typically include at least 30 weight percent $SiO_2$ and at least 20 weight percent $Al_2O_3$. For example, suitable ceramic fibers can contain $SiO_2$ in an amount of 30 to 80 weight percent and $Al_2O_3$ in an amount of 20 to 70 weight percent weight percent based on the weight of the fibers. In some specific examples, the ceramic fibers can contain $SiO_2$ in an amount of 40 to 60 weight percent and alumna in an amount of 40 to 60 weight percent based on the weight of the fibers. In other specific examples, the ceramic fibers can contain $SiO_2$ in an amount of 45 to 55 weight percent and $Al_2O_3$ in an amount of 45 to 55 weight percent based on the weight of the fibers.

Exemplary amorphous ceramic fibers that contain mainly $Al_2O_3$ and $SiO_2$ include, but are not limited to, those commercially available from Thermal Ceramics (Augusta, Ga.)

under the trade designation "KAOWOOL HA BULK" with 50 weight percent $SiO_2$ and 50 weight percent $Al_2O_3$ based on the weight of the fibers; from Thermal Ceramics under the trade designation "CERAFIBER" with 54 weight percent $SiO_2$ and 46 weight percent $Al_2O_3$ based on the weight of the fiber; from Thermal Ceramics under the trade designation "KAOWOOL D73F" with 54 weight percent $SiO_2$ and 46 weight percent $Al_2O_3$ based on the weight of the fiber; from Rath (Wilmington, Del.) under the trade designation "RATH 2300 RT" with 52 weight percent $SiO_2$, 47 weight percent $Al_2O_3$, and no greater than 1 weight percent $Fe_2O_3$, $TiO_2$, and other oxides based on the weight of the fibers; from Rath under the trade designation "RATH ALUMINO-SILICATE CHOPPED FIBER" with 54 weight percent $SiO_2$, 46 weight percent $Al_2O_3$, and no greater than 1 weight percent of other oxides based on the weight of the fiber; from Vesuvius (Buffalo, N.Y.) under the trade designation "CER-WOOL RT" with 49 to 53 weight percent $SiO_2$, 43 to 47 weight percent $Al_2O_3$, 0.7 to 1.2 weight percent $Fe_2O_3$, 1.5 to 1.9 weight percent $TiO_2$, and no greater than 1 weight percent other oxides based on the weight of the fibers; from Vesuvius under the trade designation "CER-WOOL LT" with 49 to 57 weight percent $SiO_2$, 38 to 47 weight percent $Al_2O_3$, 0.7 to 1.5 weight percent $Fe_2O_3$, 1.6 to 1.9 weight percent $TiO_2$, and 0 to 0.5 weight percent other oxides based on the weight of the fibers; and from Vesuvius under the trade designation "CER-WOOL HP" with 50 to 54 weight percent $SiO_2$, 44 to 49 weight percent $Al_2O_3$, 0 to 0.2 weight percent $Fe_2O_3$, 0 to 0.1 weight percent $TiO_2$, and no greater than 0.5 weight percent other oxides based on the weight of the fibers.

In other embodiments, the ceramic fibers are amorphous and contain mainly $SiO_2$, $Al_2O_3$, and $ZrO_2$. Small amounts of other oxides can be present. The weight ratio of $Al_2O_3$ to $SiO_2$ ($Al_2O_3$:$SiO_2$) is greater than or equal to 20:80, 30:70, 35:65, 40:60. 45:55, 50:50, 55:45, 60:40, or 70:30. The fibers contain at least 3 weight percent $ZrO_2$, at least 30 weight percent $SiO_2$, and at least 20 weight percent $Al_2O_3$ based on the weight of the fiber. In some embodiments, the fibers contain $ZrO_2$ in an amount up to 5 weight percent, up to 7 weight percent, up to 10 weight percent, up to 12 weight percent, up to 15 weight percent, up to 16 weight percent, up to 20, or up to 25 weight percent based on the weight of the fibers. The ceramic fibers can contain $SiO_2$ in an amount of 30 to 70, 40 to 65, 45 to 60, 45 to 55, or 50 to 60 weight percent based on the weight of the fibers. The ceramic fibers can contain $Al_2O_3$ in an amount of 20 to 60, 25 to 50, 25 to 45, 25 to 40, 25 to 35, 30 to 50, or 30 to 40 weight percent based on the weight of the fibers. In some specific examples, the ceramic fibers contain 25 to 50 weight percent $Al_2O_3$, 40 to 60 weight percent $SiO_2$, and 3 to 20 weight percent $ZrO_2$ based on the weight of the fibers. In other specific examples, the ceramic fibers contain 30 to 40 weight percent $Al_2O_3$, 45 to 60 weight percent $SiO_2$, and 5 to 20 weight percent $ZrO_2$ based on the weight of the fibers.

Exemplary amorphous ceramic fibers that contain $SiO_2$, $Al_2O_3$, and $ZrO_2$ are commercially available from Thermal Ceramics (Augusta, Ga.) under the trade designation "KAOWOOL ZR" and "CERACHEM" with 50 weight percent $SiO_2$, 35 weight percent $Al_2O_3$, and 15 weight percent $ZrO_2$ based on the weight of the fiber; from Unifrax-(Tonawonda, N.Y.) under the trade designation "UNIFRAX FIBERFRAX FIBERMAT" with 52 to 57 weight percent $SiO_2$, 29 to 47 weight percent $Al_2O_3$, and no greater than 18 weight percent $ZrO_2$ based on the weight of the fibers; from Unifrax under the trade designation "UNIFRAX FIBERFRAX DURABACK" with 50 to 54 weight percent $SiO_2$, 31 to 35 weight percent $Al_2O_3$, 5 weight percent $ZrO_2$, 1.3 weight percent $Fe_2O_3$, 1.7 weight percent $TiO_2$, 0.5 weight percent MgO, and no greater than 7 weight percent CaO based on the weight of the fibers; from Rath (Wilmington, Del.) under the trade designation "RATH 2600 HTZ" with 48 weight percent $SiO_2$, 37 weight percent $Al_2O_3$, 15 weight percent $ZrO_2$, and no greater than 1 weight percent other oxides based on the weight of the fibers; and from Vesuvius (Buffalo, N.Y.) under the trade designation "CER-WOOL HTZ" with 44 to 51 weight percent $SiO_2$, 33 to 37 weight percent $Al_2O_3$, 13 to 19 weight percent $ZrO_2$, 0.1 to 0.6 weight percent $Fe_2O_3$, 0.1 to 0.6 weight percent $TiO_2$, and no greater than 1 weight percent other oxides based on the weight of the fibers.

In some embodiments of the non-intumescent layer(s) or strip(s), the ceramic fibers have a bulk shrinkage no greater than 10 percent, no greater than 8 percent, no greater than 6 percent, no greater than 4 percent, no greater than 3 percent, no greater than 2 percent, or no greater than 1 percent using the Thermal Mechanical Analyzer (TMA) test. The ceramic fibers typically shrink at least 0.5 percent. In some embodiments, the ceramic fibers have a bulk shrinkage of 0.5 to 2 percent, 0.5 to 3 percent, 0.5 to 5 percent, or 0.5 to 6 percent.

In the TMA test, a sample under a load (e.g., 50 psi or 345 $N/m^2$) is heated to 1000° C. and then cooled. The caliper of the sample can be measured during both the heating and cooling cycles at 750° C. to calculate percent shrinkage. The percent shrinkage is equal to the difference in the caliper at 750° C. during the heating and cooling step multiplied by 100 and divided by the caliper at 750° C. during the heating step. The TMA test can be used to characterize the ceramic fibers or an non-intumescent layer prepared from ceramic fibers. Most or all of the organic materials that may be present in a non-intumescent layer are removed by time the temperature of the Thermal Mechanical Analyzer reaches 750° C.

Examples of ceramic fibers having a bulk shrinkage no greater than 10 percent as supplied (i.e., the fibers can be used as supplied without a heat-treatment) include, but are not limited to, fibers that are crystalline and that contain both $Al_2O_3$ and $SiO_2$. The weight ratio of $Al_2O_3$ to $SiO_2$ ($Al_2O_3$:$SiO_2$) can be greater than or equal to 60:40, 65:35, 70:30, 72:28, 75:25, 80:20, 90:10, 95:5, 96:4, 97:3, or 98:2. In some specific examples, the ceramic fibers contain 60 to 98 weight percent $Al_2O_3$ and 2 to 40 weight percent $SiO_2$ based on the weight of the fibers. In other specific examples, the ceramic fibers contain 70 to 98 weight percent $Al_2O_3$ and 2 to 30 weight percent $SiO_2$ based on the weight of the fibers. Traces of other oxides can be present. As used herein, the term "trace" refers to an amount no greater than 2 weight percent, no greater than 1 weight percent, or no greater than 0.5 weight percent.

Suitable ceramic fibers that are crystalline and have a bulk shrinkage no greater than 10 percent include, but are not limited, to those commercially available from Mitsubishi Chemical (Tokyo, Japan) under the trade designation "MAFTEC" (e.g., MLS1, MLS2, and MLS3) with 28 weight percent $SiO_2$ and 72 weight percent $Al_2O_3$ based on the weight of the fibers; from Saffil Limited (Widness Cheshire, U.K.) under the trade designation "SAFFIL" (e.g., SF, LA Bulk, HA Bulk, HX Bulk) with 3 to 5 weight percent $SiO_2$ and 95 to about 97 weight percent $Al_2O_3$ based on the weight of the fibers; and from Unifrax (Tonawonda, N.Y.) under the trade designation "UNIFRAX FIBERFRAX FIBERMAX" with 27 weight percent $SiO_2$ and 72 weight percent $Al_2O_3$ based on the weight of the fibers.

Further examples of ceramic fibers that are crystalline and have a bulk shrinkcage no greater than 10 percent as supplied are aluminoborosilicate fibers. These fibers typically contain $Al_2O_3$ in an amount of at least 50 weight percent, $SiO_2$ in an amount no greater than 50 weight percent, and $B_2O_3$ in an amount no greater than 25 weight percent based on the weight of the fibers. Some specific aluminoborosilicate fibers contain 50 to 75 weight percent $Al_2O_3$, 25 to 50 weight percent $SiO_2$, and 1 to 25 weight percent $B_2O_3$ based on the weight of the fibers. Such aluminoborosilicate fibers are commercially available under the trade designation "NEXTEL 312" and "NEXTEL 440" from 3M Company (St. Paul, Minn.).

At least some of these ceramic fibers that are crystalline and that have a bulk shrinkage no greater than 10 percent as supplied by the manufacturer are prepared using a sol-gel process. In a sol-gel process, the ceramic fibers are formed by spinning or extruding a solution, dispersion, or viscous concentrate. The sol-gel process, which is further described in U.S. Pat. No. 3,760,049 (Borer et al.), can include extrusion of the solution, dispersion, or concentrate through orifices to form green fibers that are then fired to form ceramic fibers. The solution, dispersion, or concentrate contains the oxides or the precursors to the oxides that are in the fibers.

In some embodiments, commercially available amorphous ceramic fibers can be heat-treated to provide ceramic fibers that have a bulk shrinkage no greater than 10 percent. The ceramic fibers that can be heat-treated to provide fibers having a bulk shrinkage no greater than 10 percent typically are melt-blown or melt-spun from a mixture of $Al_2O_3$ and $SiO_2$ or a mixture of $Al_2O_3$ and $SiO_2$ with other oxides such as $B_2O_3$, $P_2O_5$, or $ZrO_2$. Exemplary amorphous ceramic fibers that can be heat-treated include, but are not limited to, ceramic fibers commercially available from Thermal Ceramics (Augusta, Ga.) under the trade designation "KAOWOOL HA BULK", "CERAFIBER", "KAOWOOL D73F", "KAOWOOL ZR", or "CERACHEM"; from Rath (Wilmington, Del.) under the trade designation "RATH 2300 RT", "RATH ALUMINO-SILICATE CHOPPED FIBER", or "RATH 2600 HTZ"; from Vesuvius (Buffalo, N.Y.) under the trade designation "CER-WOOL RT", "CER-WOOL LT", or "CER-WOOL HTZ", or "CER-WOOL HP"; and from Unifrax (Tonawonda, N.Y.) under the trade designation "UNIFRAX FIBERFRAX FIBERMAT" or "UNIFRAX FIBERFRAX DURABACK".

The ceramic fibers tend to devitrify (i.e., change, at least in part, from an amorphous state into a microcrystalline or crystalline state) during the heat-treatment process. Usually, only a portion of the individual ceramic fiber undergoes devitrification. That is, after heat-treatment, the individual ceramic fibers contain amorphous material as well as crystalline material, microcrystalline material, or a combination of crystalline and microcrystalline material.

Techniques such as transmission electron microscopy and x-ray diffraction can be used to characterize the amorphous, crystalline, or microcrystalline nature of inorganic fibers. As used herein, the term "amorphous" refers to inorganic fibers that are free of crystalline or microcrystalline regions. If the inorganic fibers are amorphous, no diffraction peaks (i.e., no diffraction pattern) can be detected using either transmission electron microscopy or x-ray diffraction. If the inorganic fiber contains regions having a small crystalline size (i.e., microcrystalline), diffraction peaks (i.e., a diffraction pattern) can be detected using transmission electron microscopy but not using x-ray diffraction. As used herein, the term "microcrystalline" refers to inorganic fibers that have at least some regions with a crystalline character and that have a crystal size detectable with transmission electron microscopy but not with x-ray diffraction. If the inorganic fibers contain regions having a larger crystalline size (i.e., crystalline), a diffraction pattern can be obtained using x-ray diffraction. As used herein, the term "crystalline" refers to inorganic fibers that have at least some regions with a crystalline character and that have a crystal size detectable with x-ray diffraction. The smallest crystal sizes detectable using x-ray diffraction typically results in a broad diffraction pattern without well-defined peaks. Narrower peaks indicate a larger crystalline size. The width of the diffraction peaks can be used to determine the crystalline size. The inorganic fibers that are crystalline are usually polycrystalline rather than being single crystals.

In some applications, the ceramic fibers are heat-treated at a temperature of at least 700° C. For example, the ceramic fibers can be heat-treated at a temperature of at least 800° C., at a temperature of at, least 900° C., at a temperature of at least 1000° C., or at a temperature of at least 1100° C. Suitable heat-treatment temperatures can vary depending on the composition of the ceramic fibers and the time the ceramic fibers are held at the heat-treatment temperature. Suitable heat-treatment methods and suitable heat-treated ceramic fibers are further described, for example, in International Patent Application WO 99/46028 (Fernando et al.) and U.S. Pat. No. 5,250,269 (Langer), the disclosure of which are incorporated herein by reference.

There is a time-temperature relationship associated with the size of crystals or microcrystals that form during the heat-treatment process. For example, the ceramic fibers can be heat-treated at lower temperatures for longer periods of time or at higher temperatures for shorter periods of time to produce a comparable state of crystallinity or microcrystallinity. The time at the heat-treatment temperature can be up to 1 hour, up to 40 minutes, up to 30 minutes, up to 20 minutes, up to 10 minutes, up to 5 minute, up to 3 minutes, or up to 2 minutes. For example, the heat-treatment temperature can be chosen to use a relatively short heat-treatment time such as up to 10 minutes.

The temperature of the heat-treatment can be chosen to be at least 20° C., at least 30° C., at least 40° C., at least 50° C., at lest 60° C., at least 70° C., at least 80° C., at least 90° C., or at least 100° C. above the devitrification temperature (i.e., the temperature at which the ceramic fibers change from being an amorphous material to being a microcrystalline or crystalline material). Suitable heat-treatment times and temperatures for the ceramic fibers can be determined using techniques such as, for example, Differential Thermal Analysis (DTA). The temperature for $Al_2O_3$-$SiO_2$ fibers is typically in the range of 700° C. to 1200° C., in the range of 800° C. to 1200° C., in the range of 900° C. to 1200° C., or in the range of 950° C. to 1200° C.

A ceramic fiber that is completely amorphous usually shrinks more than ceramic fiber that contain regions that are microcrystalline, crystalline, or a combination thereof. Ceramic fibers that are at least partially crystalline or microcrystalline can be fabricated into mounting mats that can be repeatedly heated to a temperature suitable for use in a pollution control device and then cooled. Microcrystalline or crystalline ceramic fibers tend to be resistant to further shrinkage that could negatively impact the performance of the non-intumescent layer.

For ceramic fibers that are subjected to heat-treatment, the brittleness of the fibers can be balanced with the low bulk shrinkage characteristics. Crystalline or microcrystalline ceramic fibers tend to be more brittle than amorphous ceramic fibers. Non-intumescent layers made from crystalline or microcrystalline ceramic fibers can break more easily than insulation prepared from amorphous fibers. On the other hand, crystalline or microcrystalline ceramic fibers tend to have a lower bulk shrinkage than amorphous ceramic fibers.

The average diameter of the inorganic fibers is typically at least 3 micrometers, at least 4 micrometers, at least 5 micrometers, at least 6 micrometers, or at least 7 micrometers. The inorganic fibers usually have an average diameter that is no greater than 20 micrometers, no greater than 18 micrometers, no greater than 16 micrometers, or no greater than 14 micrometers. In some embodiments, at least 60 weight percent of the inorganic fibers have an average diameter that is within 3 micrometers of the average diameter. For example, at least 70 weight percent, at least 80 weight percent, or at least 90 weight percent of the inorganic fibers have an average diameter that is within 3 micrometers of the average diameter.

The non-intumescent layer(s) or strip(s) can further contain an organic binder in amounts up to 20 weight percent based on the weight of the non-intumescent layer. In some embodiments, the organic binder is present in amounts up to 10 weight percent, up to 5 weight percent, or up to 3 weight percent based on the weight of the non-intumescent layer or strip. The organic binder is typically burned off when the multilayer mat containing the non-intumescent layer or strip is used at elevated temperatures such as those typically encountered in a pollution control device.

Suitable organic binder materials can include aqueous polymer emulsions, solvent-based polymers, and solvent free polymers. The aqueous polymer emulsions can include organic binder polymers and elastomers in the form of a latex (e.g., natural rubber lattices, styrene-butadiene lattices, butadiene-acrylonitrine lattices, and lattices of acrylate and methacrylate polymers or copolymers). The solvent-based polymeric binder materials can include a polymer such as an acrylic, a polyurethane, a vinyl acetate, a cellulose, or a rubber based organic polymer. The solvent free polymers can include natural rubber, styrene-butadiene rubber, and other elastomers.

In some embodiments, the organic binder material includes an aqueous acrylic emulsion. Acrylic emulsions advantageously tend to have good aging properties and non-corrosive combustion products. Suitable acrylic emulsions can include, but are not limited to, commercially available products such as those sold under the trade designation "RHOPLEX TR-934" (an aqueous acrylic emulsion having 44.5 weight percent solids) and "RHOPLEX HA-8" (an aqueous emulsion of acrylic copolymers having 45.5 weight percent solids) from Rohm and Hass (Philadelphia, Pa.); under the trade designation "NEOCRYL XA-2022" (an aqueous dispersion of an acrylic resins having 60.5 percent solids) available from ICI Resins US (Wilmington, Mass.); and under the trade designation "AIRFLEX 600BP DEV" (an aqueous emulsion of ethylene vinyl acrylate terpolymer having 55 weight percent solids) from Air Products and Chemical, Inc. (Philadelphia, Pa.).

Organic binders can also include a plasticizer, a tackifier, or a combination thereof. Plasticizers tend to soften a polymer matrix and can enhance the flexibility and moldability of the non-intumescent layer. For example, the organic binder can include a plasticizer such as isodecyl diphenyl diphosphate commercially available under the trade designation "SANTICIZER 148" from Monsanto (St. Louis, Mo.). Tackifiers or tackifying resins can aid in holding the insulation material together. An example of a suitable tackifier is commercially available from Eka Nobel, Inc. (Toronto, Canada) under the trade designation "SNOWTACK 810A".

The non-intumescent layer(s) or strip(s) can also contain other materials such as, but not limited to, plasticizers, wetting agents, dispersants, defoaming agents, latex. coagulants, and fungicides. Filler materials such as glass particles, calcium carbonate, expanded vermiculite, delaminated vermiculite, mica, perlite, aluminum trihydrate, magnesium phosphate hexahydrate, zinc borate, and magnesium hydroxide can be added. Additionally, inorganic binders such as clays, bentonite, and colloidal silica can be added.

The non-intumescent layer(s) or strip(s) can also contain organic fibers such as, for example, acrylics, cellulose, polyolefin, polyvinyl alcohol, polyester, or combinations thereof. The fibers can be staple fibers or fibrillated fibers. Useful stable fibers typically have a size of about 0.5 to 5 denier. Suitable rayon fibers having a size of 1.5 denier per filament are commercially available from Minifiber, Inc. (Johnson City, Tex.). Suitable polyvinyl alcohol fibers are commercially available from Kuraray Americas, Inc. (New York, N.Y.) under the trade designation "KURALON". An acrylic fiber pulp is commercially available under the trade designation "CFF" from Cytek Industries, Inc. (West Paterson, N.J.).

A suitable non-intumescent layer or strip can include, at least in some embodiments, inorganic fibers in an amount of 10 to 99.5 weight percent and organic binders in an amount of 0.5 to 20 weight percent. For example, the non-intumescent layer or strip can contain inorganic fibers in an amount of 20 to 99.5 weight percent, organic binder in an amount of 0.5 to 20 weight percent, and up to 60 weight percent inorganic binders or fillers.

One non-intumescent layer that can be used according to the present invention contains heat-treated aluminosilicate ceramic fibers is commercially available from 3M Company (St. Paul, Minn.) under the trade designation "INTERAM 900HT". This mat has a bulk density of about 0.25 g/cm$^3$ and a weight per unit area of about 1020 to about 2455 g/m$^2$. Other more resilient non-intumescent layer(s) or strip(s) include those commercially available from 3M Company under the trade designation "INTERAM 110HT" and "INTERAM 1101HT". These mats have a bulk density of about 0.15 g/cm$^3$ and a weight per unit area of about 440 to about 2100 g/m$^2$. These mats contain crystalline alumina fibers (i.e., polycrystalline alumina fibers). Another suitable non-intumescent layer that includes magnesium aluminosilicate glass fibers is commercially available from 3M Company under the trade designation "INPE 571.02." This mat has a bulk density of 0.12 g/cm$^3$ and a weight per unit area of about 600 to about 1400 g/m$^2$. A needle-bonded mat is commercially available from Mitsubishi Chemical Company, Tokyo, Japan under the trade designation "MAFTEC MLS-3" with a bulk density of about 0.16 g/cm$^3$. This mat contains about 72 weight percent $Al_2O_3$ and about 28 weight percent $SiO_2$ based on the weight of the fibers.

The intumescent layers contains at least one type of intumescent material. The iiitumescent layers can further include inorganic fibers, organic binders, plasticizers, wetting agents, dispersants, defoaming agents, latex coagulants, fungicides, filler materials, inorganic binders, and organic fibers. These additional components are the same as those discussed above for the non-intumescent layer.

Examples of suitable intumescent materials for the intumescent layer include unexpanded vermiculite, hydrobiotite, water swellable synthetic tetrasilicic fluorine type mica as described in U.S. Pat. No. 3,001,571 (Hatch), alkali metal silicate granules as described in U.S. Pat. No. 4,521,333 (Graham et al.), expandable graphite, or combinations thereof. Alkaline metal silicate granules are commercially available from 3M Company (St. Paul, Minn.) under the trade designation "EXPANTROL 4BW". Expandable graphite is commercially available under the trade designation "GRAFOIL GRADE 338-50" from UCAR Carbon Co., Inc. (Cleveland, Ohio). Unexpanded vermiculite is commercially available from Cometals Inc. (New York, N.Y.). In some applications, the intumescent materials are selected from unexpanded vermiculite, expandable graphite, or a combination thereof.

The vermiculite can be treated, for example, with salts such as ammonium dihydrogen phosphate, ammonium nitrate, ammonium chloride, potassium chloride, or other soluble salts known in the art. The treatment is based on an ion exchange reaction.

The intumescent layer often contain at least 5, at least 10, at least 20, at least 40, or at least 60 weight percent intumescent material based on the weight of the intumescent layer. In some intumescent layers, the layer can be free of inorganic fibers. In other intumescent layers, the layer can be free of inorganic fibers and organic binders. In still other intumescent layers, the layer contains 5 to about 85 weight percent intumescent material and less than 20 weight percent organic binder based on the weight of the intumescent layer. Inorganic fibers are included in some intumescent layers.

In some more specific example, the intumescent layer includes intumescent materials in an amount of 5 to 85 weight percent, organic binder in an amount of 0.5 to 15 weight percent, and inorganic fibers in an amount of 10 to 60 weight percent based on the weight of the intumescent layer. In other examples, the intumescent layer includes intumescent materials in an amount of 5 to 70 weight percent, organic binder in an amount of 0.5 to 10 percent, and inorganic fibers in an amount of 30 to 45 weight percent based on the weight of the intumescent layer. In still other examples, the intumescent layer includes intumescent materials in an amount of 20 to 65 weight percent, organic binders in an amount of 0.5 to 20 weight percent, inorganic fibers in an amount of 10 to 65 weight percent, and up to 40 weight percent inorganic fillers or inorganic binders.

Suitable intumescent layers are commercially available from 3M (St. Paul, Minn.) under the trade designations "INTERAM 100", "INTERAM 200", "INTERAM 550", and "INTERAM 2000 LT". These mats usually have a bulk density of about 0.4 to about 0.7 g/cm$^3$ and a weight per unit area of about 1050 g/m$^2$ to about 8140 g/m$^2$. Another suitable intumescent layer is commercially available from 3M under the trade designation "INTERAM 570NC". This layer usually has a weight per unit area of about 1050 g/m$^2$ to about 4070 g/m$^2$ and contains inorganic fibers that that meet European non-classified fiber regulations.

In some intumescent layers, biosoluble inorganic fibers are included. Intumescent layers containing biosoluble fibers are further described in International Patent Application Publication WO 03/031368 (Howorth), incorporated herein by reference in its entirety. As used herein, "biosoluble inorganic fibers" refer to inorganic fibers that are decomposable in a physiological medium or a simulated physiological medium. Physiological medium refers to, but is not limited to, those bodily fluids typically found in the respiratory tract such as, for example, the lungs of animals or humans.

The biosoluble inorganic fibers typically include inorganic oxides such as, for example, $Na_2O$, $K_2O$, CaO, MgO, $P_2O_5$, $Li_2O$, and BaO, or combinations thereof with silica. Other metal oxides or other ceramic constituents can be included in the biosoluble inorganic fibers even though these constituents, by themselves, lack the desired solubility but are present in low enough quantities such that the fibers, as a whole, are still decomposable in a physiological medium. Such metal oxides include, for example, $Al_2O_3$, $TiO_2$, $ZrO_2$, $B_2O_3$, and iron oxides. The biosoluble inorganic fibers can also include metallic components in amounts such that the fibers are decomposable in a physiological medium or simulated physiological medium.

In one embodiment, the biosoluble inorganic fibers include silica, magnesium oxide, and calcium oxide. These types of fibers are typically referred to as calcium magnesium silicate fibers. The calcium magnesium silicate fibers usually contain less than about 10 weight percent aluminum oxide. Suitable biosoluble fibers can include 45 to 90 weight percent $SiO_2$, up to 45 weight percent CaO, up to 35 weight percent MgO, and less than 10 weight percent $Al_2O_3$. For example, the fibers can contain about 55 to about 75 weight percent $SiO_2$, about 25 to about 45 weight percent CaO, about 1 to about 10 weight percent MgO, and less than about 5 weight percent $Al_2O_3$.

Exemplary biosoluble inorganic oxides fibers are described in U.S. Pat. No. 5,332,699 (Olds et al.); U.S. Pat. No. 5,585,312 (TenEyck et al.); U.S. Pat. No. 5,714,421 (Olds et al.); and U.S. Pat. No. 5,874,375 (Zoitas et al.). Various methods can be used to form biosoluble inorganic fibers including, but not limited to, sol gel formation, crystal growing processes, and melt forming techniques such as spinning or blowing.

Biosoluble fibers are commercially available from Unifrax Corporation (Niagara Falls, N.Y.) under the trade designation "INSULFRAX". Other biosoluble fibers are sold by Thermal Ceramics (located in Augusta, Ga.) under the trade designation "SUPERWOOL." For example, SUPERWOOL 607 contains 60 to 70 weight percent $SiO_2$, 25 to 35 weight percent CaO, 4 to 7 weight percent MgO, and a trace amount of $Al_2O_3$. SUPERWOOL 607 MAX can be used at a slightly higher temperature and contains 60 to 70 weight percent $SiO_2$, 16 to 22 weight percent CaO, 12 to 19 weight percent MgO, and a trace amount of $Al_2O_3$.

An exemplary intumescent layer can include intumescent material in an amount of 10 to 80 weight percent, biosoluble inorganic fibers in an amount of 5 to 80 weight percent, micaceous binder in an amount of 5 to 80 weight percent, and organic binder in an amount of 0.5 to 20 weight percent.

As used herein, "micaceous binder" refers to one or more micaceous minerals that can be wetted and then dried to form a cohesive body that is self-supporting. As used herein, "self-supporting" refers to a micaceous binder that can be formed into a 5 cm×5 cm×3 mm sheet containing no other materials such that the dried sheet can be held horizontally at any edge for at least 5 minutes at 25° C. and up to 50 percent relative humidity without crumbling or otherwise falling apart.

As used herein, the phrase "micaceous mineral" refers to a family of minerals that can be split or otherwise separated into planar sheets or platelets. Micaceous minerals include, but are not limited to, expanded vermiculite, unexpanded vermiculite, and mica. Micaceous minerals typically have an average aspect ratio (i.e., the length of a particle divided by its thickness) that is greater than about 3. Micaceous minerals that typically have a particle size less than about 150 micrometers (e.g., the micaceous binder contains micaceous minerals that can pass through a 100 mesh screen). In some embodiments, the micaceous binder contains micaceous minerals having a size less than about 150 micrometers and having an average aspect ratio of greater than about 8 or greater than about 10.

Suitable micaceous binders can include micaceous minerals that have been crushed. As used herein, "crushed" refers to micaceous minerals that have been processed in any suitable manner that reduces the average particle size. Methods of crushing include, but are not limited to, mechanical shearing of a dilute or concentrated slurry, milling, air impact, and rolling. Other methods can be used alone or in combination with crushing to reduce the particle size. For example, thermal or chemical methods can be used to expand or expand plus exfoliate the micaceous minerals. Expanded vermiculite can be sheared or otherwise processed in water to produce an aqueous dispersion of delaminated vermiculite particles or platelets. Shearing can be adequately performed, for example, using a high shear mixer such as a blender.

In some embodiments, the micaceous binder includes processed vermiculites (i.e., vermiculate that has been expanded, delaminated, and crushed). Processed vermiculite is typically non-intumescent. In other embodiments, the micaceous binder includes vermiculite that has not been expanded and delaminated or that has been only partially expanded and delaminated. Such materials tend to be intumescent.

Suitable micaceous binders are commercially available from W. R. Grace & Company, and include a delaminated vermiculite powder (under the trade designation "VFPS") and an aqueous dispersion of chemically exfoliated vermiculite (under the trade designation "MICROLITE). Also, expanded vermiculite flakes are available from W. R. Grace and Company (under the trade designation "ZONELITE #5") that can be reduced in particle size to form a micaceous binder.

The micaceous binder can include vermiculite having a particle size less than about 150 micrometers and the intumescent material can include vermiculite having a particle size greater than about 150 micrometers (none passes through a 100 mesh screen). The intumescent vermiculite can have an average particle size that is greater than about 300 micrometers.

In one embodiment of a multilayer mat, the non-intumescent layer(s) or strip(s) contains glass fibers and the intumescent layer(s) contain vermiculite. In another embodiment of the multilayer mat, the non-intumescent layer(s) or strip(s) contains refractory ceramic fibers having a shrinkage no greater than 10 percent based on the TMA test and the intumescent layer(s) contain vermiculite.

Each non-intumescent layer or strip in the multilayer mat usually has a bulk density in the range of about 0.05 g/cm$^3$ to about 0.4 g/cm$^3$ while the intumescent layer has a bulk density in the range of about 0.4 g/cm$^3$ to about 0.75 g/cm$^3$. As used herein, the term "bulk density" refers to the density of a layer, strip or multilayer mat that is not under compression. The bulk density of the multilayer mat depends on the thickness and composition of the various layers but is typically about 0.2 g/cm$^3$ to about 0.5 g/cm$^3$. In some applications, the multilayer mats have a compressed density of about 0.4 g/cm$^3$ to about 0.9 g/cm$^3$. As used herein, the term "compressed density" refers to the density of the multilayer mat after being assembled around a pollution control element in a pollution control device. A paper making process is used to form the non-intumescent layer(s), strip(s), the intumescent layer(s), or a combination thereof. For example, a non-intumescent layer(s) or strip(s) can be prepared by forming an aqueous slurry containing the inorganic fibers. The aqueous slurry often contains up to 30 weight percent solids based on the weight of the slurry (e g., the slurry can contain up to 20 weight percent or up to 10 weight percent solids based on the weight of the slurry). The slurry often contains at least 1 percent solids based on the weight of the slurry (e.g., slurry can contain at least 2 weight percent or at least 3 weight percent solids). In some embodiments, the slurry can contain 1 to 10, 2 to 8, or 3 to 6 weight percent solids. Higher solids can be advantageous because less water needs to be removed to prepare the preform. However, slurries with higher percent solids tend to be more difficult to mix.

The intumescent layer can be prepared by forming an aqueous slurry containing the intumescent material. The percent solids can be comparable to those used to prepare the non-intumescent layer. The aqueous slurry for the intumescent layer often contains inorganic fibers however intumescent layers can be free of inorganic fibers.

The water used in each aqueous slurry can be well water, surface water, or water that has been treated to remove impurities such as salts and organic compounds. When well or surface water is used in the aqueous slurry, salts (e.g., calcium and magnesium salts) present in the water can function as an inorganic binder. In some embodiments, the water is deionized water, distilled water, or a combination thereof.

Other additives can also be included in each aqueous slurry composition. Such additives can include inorganic binders, inorganic fillers, defoamers, flocculants, surfactants, and the like. Strength enhancing agents can also be included such as, for example, organic fibers.

Other methods can be used to prepare the non-intumescent layer(s) or strip(s); In some applications, the non-intumescent layer or strip can be prepared as a non-woven mat by chopping individual inorganic fibers to a desired length. Such a method is described in International Patent Application Publication WO 2004/011785 (Merry et al.), incorporated herein by reference. The individualized fibers can be prepared by chopping a tow or yarn of fiber using a glass roving cutter commercially available under the trade designation "MODEL 90 GLASS ROVING CUTTER" from Film and Fram, Inc. (Pacoma, Calif.). Alternatively, the chopped individualized fibers can be formed using a hammer mill and then a blower. The fibers are usually chopped to a length ranging from about 0.5 to about 15 cm. A mat can be formed using a conventional web forming machine such as those commercially available from Rando Machine Corp. (Macedon, N.Y.) under the trade designation "RANDO WEBBER" or from ScanWeb Co. (Demnark) under the trade designation "DAN WEB". The chopped individualized fibers can be drawn onto a wire screen or mesh belt (e.g., a metal or nylon belt). Depending on the length of the fibers, the resulting mat can have sufficient handleability to be transferred to a needle punch or stitch bonding machine without a support such as a scrim. To facilitate ease of handing, some mats can be formed or placed on a scrim.

A needle-punched nonwoven mat-refers to a mat where there is physical entanglement of the inorganic fibers provided by multiple full or partial penetrations of the mat with barbed needles. Needle punching generally involves compressing a nonwoven mat and then punching and drawing barbed needles through the mat. Although the optimum number of needle punches per area of mat depends on the particular application, the nonwoven mat is often punched to provide about 5 to about 60 punches/cm$^2$. In some applications the mats have 10 to about 20 punches/cm$^2$. The nonwoven mat can be needle punched using a conventional needle punching machine such as those commercially available from Dilo (Germany) with barbed needles commercially available from Foster Needle Company (Manitowoc, Wis.).

Alternatively, the nonwoven mat can be stitch bonded using techniques such as those disclosed in U.S. Pat. No. 4,181,514 (Leflcowitz et al.), the disclosure of which is incorporated herein by reference. The mat can be stitch bonded using an organic thread or an inorganic thread (e.g., ceramic or stainless steel). A relatively thin layer of inorganic or organic sheet material can be placed on either or both sides of the mat during stitching to prevent or minimize the threads from cutting through the mat. The spacing of the stitches can be varied but is usually about 3 to about 30 mm so that the fibers are uniformly compressed throughout the entire area of the mat. A commercially available needle punched non-intumescent layer can be obtained from Mitsubishi Chemical (Tokyo, Japan) under the trade designation "MAFTEC".

The intumescent layer can be in the form of a paste applied to a major surface of a non-intumescent layer. Suitable paste compositions for intumescent layers are further described, for example, in U.S. Pat. No. 5,853,675 (Howorth) and U.S. Pat. No. 5,207,989 (MacNeil), incorporated herein by reference. Some of these compositions include inorganic fibers in addition to the intumescent material. The pastes can be applied initially, for example, to a substrate such as a release liner or paper. The substrate can be removed after contacting the paste with a major surface of a non-intumescent layer.

In other multilayer mats, the intumescent layer can be formed by spraying a suitable intumescent composition onto a major surface of a non-intumescent layer. The compositions can include, for example, other materials such as inorganic fibers or organic binders. Alternatively, intumescent material free of a binder can be applied to a portion of a major surface of a non-intumescent layer.

The various layers can be individually prepared and then bonded together. The various layers of the multilayer mat can be bonded to each other using needle punching or stitch bonding techniques. Some of the multilayer mats have an adhesive to adhere the non-intumescent and intumescent layers together. Each layer can be prepared separately and then bonded together. The adhesive can be a pressure sensitive adhesive or a hot melt adhesive. In some multilayer mats, the adhesive is a hot melt adhesive such as, for example, the adhesive commercially available from Bostik-Findley (Stafford, UK) under the trade designation "PE 105-50" or "PE 65-50".

The multilayer mat can be prepared using a paper making process. One such process is described in U.S. Patent Publication 2001/0046456 (Langer et al.), the disclosure of which is incorporated herein by reference. A first slurry containing inorganic fibers can be prepared and then deposited on a permeable substrate. The deposited first slurry can be partially dewatered to form a first layer. An intumescent composition can be applied to a portion of the first layer to form a second layer. The intumescent composition can be applied, for example, by spraying if the composition includes a liquid or by sprinkling if the composition is free of a liquid. A second slurry containing inorganic fibers can be prepared and then deposited on over the second layer and any exposed first layer. The deposited third slurry can be at least partially dewatered to form a third layer. After the final layer has been deposited, the mat can be dried to remove at least a portion of any remaining water. For example, the mat can be compressed and dried by passing the mat through heated rollers Such a process can result in some intermingling of the layers. The intermingling of the layers can be practically invisible to the eye or can be to such an extent that a visible boundary or gradient layer forms between two adjacent layers. With such a process, the layers can be bonded together without the use of an adhesive, stitches, needles, or staples.

The foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A multilayer mat for mounting a pollution control element in a pollution control device, said mat comprising:
    at least one non-intumescent layer comprising ceramic fibers and having a width defined by opposite lateral edges; and
    at least one intumescent layer comprising an intumescent material and having a width defined by opposite lateral edges,
    wherein the width of said intumescent layer is less than the width of said non-intumescent layer, no portion of said at least one non-intumescent layer is coplanar with said intumescent layer, and said intumescent layer has an exposed major surface.

2. The multilayer mat as in claim 1, wherein said at least one non-intumescent layer and said at least one intumescent layer are disposed relative to one another such that both lateral edges of said at least one intumescent layer are positioned within the lateral edges of said at least one non-intumescent layer.

3. The multilayer mat as in claim 1, wherein said at least one non-intumescent layer and said at least one intumescent layer are disposed relative to one another such that one of the lateral edges of said at least one intumescent layer is in-line with one of the lateral edges of said at least one non-intumescent layer, and only the other lateral edge of said at least one intumescent layer lies within the lateral edges of said at least one non-intumescent layer.

4. The multilayer mat as in claim 1, wherein said non-intumescent layer has a thickness in the range of from about 0.5 mm to about 20 mm and a bulk density in the range of from about 0.05 g/cc to about 0.4 g/cc, and said intumescent layer has a thickness in the range of from about 0.5 mm to about 15 mm and a bulk density in the range of from about 0.4 g/cc to about 0.75 g/cc.

5. The multilayer mat as in claim 1, further comprising at least one non-intumescent strip of one or more layers comprising ceramic fibers, with one said non-intumescent strip being positioned alongside one lateral edge of said at least one intumescent layer, wherein the width of said strip is narrower than the width of said at least one intumescent layer.

6. The multilayer mat as in claim 5, wherein said at least one non-intumescent strip is two non-intumescent strips, with each non-intumescent strip being of one or more layers comprising ceramic fibers, and with one said non-intumescent strip being disposed alongside each lateral edge of said at least one intumescent layer, wherein the width of each said strip is narrower than the width of said at least one intumescent layer.

7. The multilayer mat as in claim 5, wherein the combined widths of said at least one non-intumescent strip and said intumescent layer are together substantially equal to the width of said non-intumescent layer.

8. The multilayer mat as in claim 5, wherein said at least one non-intumescent strip and said at least one intumescent layer are substantially co-planar.

9. The multilayer mat as in claim 5, wherein said at least one non-intumescent strip has a length that is substantially equal to the length of said at least one intumescent layer.

10. The multilayer mat as in claim 5, wherein each said non-intumescent strip has a thickness in the range of from about 0.5 mm to about 20 mm and a bulk density in the range of from about 0.05 g/cc to about 0.4 g/cc, said non-intumescent layer has a thickness in the range of from about 0.5 mm to about 20 mm and a mount density bulk density in the range of from about 0.05 g/cc to about 0.4 g/cc, and said intumescent layer has a thickness in the range of from about 0.5 mm to about 15 mm and a bulk density in the range of from about 0.4 g/cc to about 0.75 g/cc.

11. A pollution control device comprising:
    a housing having an inner wall;
    a pollution control element disposed in said housing so as to form a gap therebetween; and
    a multilayer mat as in claim 5,
    wherein said mat is disposed in said gap so as to mount said pollution control element in said housing.

12. The pollution control device as in claim 11, wherein a portion of the inner wall of said housing defines a recess, said mat is positioned so that said intumescent layer is received within said recess and not exposed to exhaust gases passing through said pollution control device, and one said non-intumescent strip is exposed to exhaust gases passing through said pollution control device.

13. A pollution control device comprising:
a housing having an inner wall;
a pollution control element disposed in said housing so as to form a gap therebetween; and
a multilayer mat as in claim 1,
wherein said mat is disposed in said gap so as to mount said pollution control element in said housing.

14. The pollution control device as in claim 13, wherein a portion of the inner wall of said housing defines a recess, said mat is positioned so that at least a portion of said intumescent layer is received within said recess, and neither later edge of said intumescent layer is exposed to exhaust gases passing through said pollution control device.

15. The pollution control device as in claim 13, wherein a portion of the inner wall of said housing defines a recess, said mat is positioned so that said intumescent layer is received within said recess, and one lateral edge of said intumescent layer is exposed to exhaust gases passing through said pollution control device.

16. The pollution control device as in claim 13, wherein said non-intumescent layer is positioned adjacent said pollution control element.

17. The pollution control device as in claim 16, wherein said non-intumescent layer is in contact with said pollution control element.

18. The pollution control device as in claim 13, wherein at least one of the lateral edges of said intumescent layer is substantially sealed from exposure to exhaust gases passing through said pollution control device.

19. The pollution control device as in claim 13, wherein said device is a catalytic converter or an exhaust system filter.

20. An exhaust system for an internal combustion engine, said exhaust system comprising a pollution control device as in claim 13.

* * * * *

UNITED STATES PATENT AND TRADEMARK OFFICE
CERTIFICATE OF CORRECTION

PATENT NO. : 8,071,039 B2
APPLICATION NO. : 12/090008
DATED : December 6, 2011
INVENTOR(S) : Loyd Russell Hornback, III It is certified that error appears in the above-identified patent and that said Letters Patent is hereby corrected as shown below:

IN THE SPECIFICATIONS:

Column 2, line 40, delete "together," and insert -- together. --

Column 4, line 62, delete "embodiments," and insert -- embodiments. --

Column 9, line 44, delete "may -be" and insert -- may be --

Column 14, line 64, delete "16" and insert -- 116 --

Column 15, line 46, delete "may-be" and insert -- may be --

Column 16
Line 1, delete "Beckaert" and insert -- Bekaert --
Lines 2-3, delete "BEKI-SHELD" and insert -- BEKI-SHIELD --
Line 52, delete "40:60.45:55" and insert -- 40:60, 45:55 --

Column 17, line 60, delete "Unifrax-(Tonawonda," and insert -- Unifrax (Tonawonda, --

Column 18
Line 56, delete "(Widness" and insert -- (Widnes --
Line 60, delete "(Tonawonda," and insert -- (Tonawanda, --
Line 65, delete "shrinkcage" and insert -- shrinkage --

Column 19
Line 34, delete "SILICIATE" and insert -- SILICATE --
Line 37, delete "(Tonawonda," and insert -- (Tonawanda, --

Signed and Sealed this
First Day of May, 2012

David J. Kappos
*Director of the United States Patent and Trademark Office*

Column 20
Line 11, delete "at, least" and insert -- at least --
Line 35, delete "at lest" and insert -- at least --

Column 21
Line 26, delete "acrylonitrine" and insert -- acrylonitrile --
Line 63, delete "latex." and insert -- latex --

Column 22
Line 25, delete "alurninosilicate" and insert -- aluminosilicate --
Line 33, delete "110HT"" and insert -- 1100HT" --
Line 49, delete "iiitumescent" and insert -- intumescent --

Column 25, line 54, Delete "(e g.," and insert -- (e.g., --

Column 26
Line 16, delete "strip(s);" and insert -- strip(s). --
Line 24, delete "Film" and insert -- Finn --
Line 25, delete "(Pacoma," and insert -- (Pacoima, --
Line 32, delete "(Demnark)" and insert -- (Denmark) --
Line 40, delete "mat-refers" and insert -- mat refers --
Line 56, delete "(Leflcowitz et al.)," and insert -- (Lefkowitz et al.), --

Column 27, line 47, After "rollers" insert -- . --